United States Patent
Navon et al.

(10) Patent No.: US 11,893,598 B1
(45) Date of Patent: Feb. 6, 2024

(54) ON-CHAIN LOYALTY PROGRAM MANAGEMENT

(71) Applicant: PAYPAL, INC., San Jose, CA (US)

(72) Inventors: Alon Navon, Tel Aviv (IL); Gil Meir, Tel Aviv (IL); Avihai Yosef, San Jose, CA (US); Yehonatan Yochpaz, Holon (IL)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/816,109

(22) Filed: Jul. 29, 2022

(51) Int. Cl.
*G06Q 30/00* (2023.01)
*G06Q 30/0226* (2023.01)
*G06Q 20/36* (2012.01)
*G06Q 20/38* (2012.01)

(52) U.S. Cl.
CPC ......... *G06Q 30/0226* (2013.01); *G06Q 20/36* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 2015/0235255 A1* | 8/2015 | Desai | G06Q 30/0232 705/14.27 |
| 2022/0215382 A1* | 7/2022 | Chen | G06Q 30/0251 |
| 2022/0309489 A1* | 9/2022 | Kahn | G06Q 20/367 |
| 2022/0343721 A1* | 10/2022 | Cardno | G07F 17/3267 |

FOREIGN PATENT DOCUMENTS

| | | | | |
|---|---|---|---|---|
| WO | WO-2018176053 A1 * | 9/2018 | ....... | G06F 17/30979 |
| WO | WO-2019227225 A1 * | 12/2019 | | |

* cited by examiner

*Primary Examiner* — Alvin L Brown
(74) *Attorney, Agent, or Firm* — Haynes and Boone, LLP

(57) ABSTRACT

Methods and systems for managing loyalty programs using a decentralized blockchain are provided. Transactions between users and a merchant are monitored via an application programming interface (API) of a service provider. Based on the monitoring, it may be determined that at least one of the users has satisfied reward criteria for a loyalty program associated with the merchant. The loyalty program includes a plurality of tokens to be distributed to users who satisfy the reward criteria configured by the merchant via a merchant interface. At least one token from among the plurality of tokens may be selected for the user, based on at least one smart contract associated with the merchant. The smart contract is stored on the blockchain in association with a unique identifier for the merchant. A transaction is broadcasted to the decentralized blockchain for transferring the at least one token to a digital wallet of the user.

20 Claims, 14 Drawing Sheets

NFT sample in json

```
class NFT:
{
    "NFT_00":
    {
        "ID": "ML_23",
        "certificate": { "....."}
        "permit":
        {
            "subject": "role_77",
            "interface":
                "QR_code": {<QR_encrypted>}, // requires key to unlock
            "object":
                { // assume not secret
                "room": "0077",
                "computer": "0011",
                "APIs":
                {
                "data_file_00aa_access", "data_field_0055_update", "data_field_0023_view", ....,
                },
                "data":
                {
                "file_00aa", "field_0055", "field_0023", ....,
                },
            },
        "shareable":
        {
            "APIs": "data_field_0023_view",
            "data": "file_00aa", "field_0023", .....
            "shared_parties_id": {<digital certificates of parties>},
            "shared_NFT_id": { .... }, // e.g. for Private Set Intersection (PSI) or stated fields, etc
            "conditions": {"not after 1800hr", ...}
        },
        "signature": .... // this is changed when the fields are updated, and has to be re-packaged and re-signed for authentication of the NFT
    }
}
```

Labels: 700, 702 (ID), 704 (certificate), 706, 710 (subject), 712 (interface), 714 (object), 708 (shareable), 716 (signature)

FIG. 7

ON-CHAIN LOYALTY PROGRAM MANAGEMENT

TECHNICAL FIELD

The present disclosure generally relates to blockchain technology, and particularly, to using blockchain technology for managing the distribution of incentives to users as part of a loyalty program.

BACKGROUND

Different entities have utilized electronic transaction processing systems to process transactions between different users and merchants. Blockchain technology may be used by merchants to improve the security of electronic transactions and store transaction data. A blockchain may provide, for example, a decentralized ledger for a merchant to record transaction data associated with various cryptocurrencies, smart contracts, and other types of transaction data. Copies or parts of the blockchain can be stored across different computer nodes, where each computer node may be configured to validate transactions and add new transaction data to the blockchain. As a new transaction is conducted, one or more of the computer nodes may be configured to validate the new transaction (e.g., through a proof-of-work or a proof-of-stake mechanism, etc.). Once the new transaction is validated, the transaction data of the new transaction may be packaged into a block and appended to the copies of the blockchain by the one or more of the computer nodes. As a blockchain system comprises a growing list of records (or blocks) that are linked together using cryptography, it is more resistant to the modification of the data stored in the blocks and therefore offers better protection against hacking relative to conventional transaction processing systems.

Aside from improving security for electronic transactions, the capabilities of blockchain technology have not been utilized to improve the aspects of a merchant's electronic transaction processing system relating to its customer interface, and particularly, those relating to its customer loyalty or rewards programs. Merchants have traditionally used such programs to incentivize return customers and to attract new customers by offering various discounts and promotions to those customers who reach a certain level of spending. For example, the merchant may require customers to spend a certain amount on purchases during a given month to receive a discount on a future purchase. However, conventional loyalty programs fail to utilize the potential benefits that a decentralized blockchain with an immutable ledger may provide to both users and merchants associated with such a program.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIG. 7 illustrates an example of a programmable grammar-based syntax for implementing a non-fungible token (NFT) using a smart contract associated with an on-chain loyalty program;

DETAILED DESCRIPTION

Figure 1:
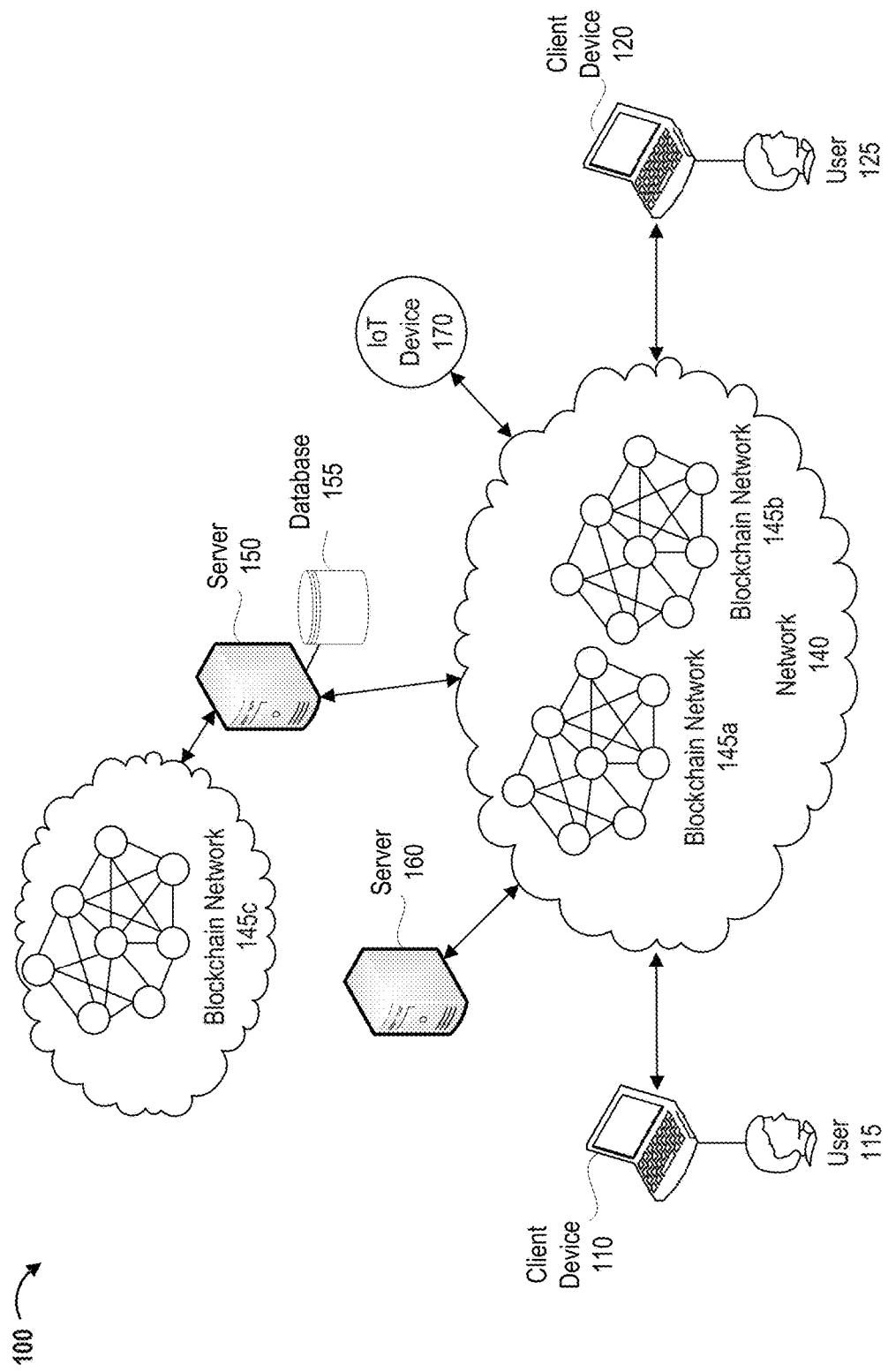
FIG. 1 is a block diagram illustrating an example of a distributed computing system for facilitating blockchain based transactions.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As will be described in further detail below, embodiments of the present disclosure may be used to provide an automated platform for managing customer loyalty programs for different merchants on a decentralized blockchain. Such an on-chain loyalty program management platform may provide, for example, a merchant interface that allows merchants to configure the rules for their respective loyalty or rewards programs. In some embodiments, the rules configured by a merchant using such an interface may include reward criteria for different categories of digital tokens. The tokens in each token category may be generated with token properties based on the reward criteria configured by the merchant for that token category. The service provider in this example may use the programmable grammar-based syntax of the smart contract to configure the token properties for each token category. The configurable properties of the tokens in each category may include a token type and a transferability status. The different token types for each category may include, for example, fungible tokens, non-fungible tokens, and semi-fungible tokens. The transferability status of each token may specify whether the token is transferrable or non-transferrable.

In some implementations, the token categories may represent different reward categories for a merchant's loyalty program. Examples of such reward categories include, but are not limited to, promotional badges, collectibles, cryptocurrency, and loyalty points. The tokens from one or more of these categories may be distributed as rewards to users (e.g., new or existing customers of the merchant) who satisfy the corresponding reward criteria. For example, a merchant may decide to offer a tiered loyalty program in which different promotional badges (e.g., "Silver" vs. "Gold" badges) in the form of fungible, non-transferrable tokens may be awarded to users in different tiers according to their spending levels over a given period of time (e.g., "Silver Badge" users who spent over $5,000 in a given month vs. "Gold Badge" users who spent over $10,000 in that same month). The users in relatively higher tiers (e.g., the Gold Badge users) of the program may receive relatively greater discounts or other incentives that can be applied to future transactions with the merchant. Additionally or alternatively, the merchant may decide to award a specified group of users (e.g., top 10 highest spending users) with a unique transferable non-fungible token (NFT), which can have a real monetary value. Furthermore, semi-fungible tokens offered by the merchant may have an internal state, e.g., a boolean value representing a redeemable award by the merchant or an integer value representing loyalty points. The loyalty points in this example may be automatically tracked by the service provider on-chain, without requiring the merchant to maintain records for this purpose in its own internal database.

The distribution of tokens to users may be based on their interactions with the merchant. Such interactions may include, for example, transactions between the users and the merchant. In some embodiments, an application programming interface (API) of a service provider associated with the merchant may be used to monitor different user transactions and automatically distribute one or more tokens to a user when it is determined that the user has satisfied the reward criteria for at least one token category. The service provider may be, for example, a payment service provider that implements the on-chain loyalty program on behalf of the merchant while also providing various payment services, e.g., payment processing services related to the transactions between the merchant and different users. Thus, the transactions that are monitored by the service provider in this example may include those that are processed by or though the service provider. In other words, the service provider may perform the monitoring operation to determine which user(s) has satisfied the reward criteria associated with a merchant's loyalty program while processing the transactions between the merchant and different users.

In some embodiments, the service provider may create a smart contract with a programmable grammar-based syntax for implementing the tokens in accordance with the reward criteria configured by a merchant via the merchant interface described above. The smart contract allows the service provider to implement a blockchain based loyalty program for a merchant's loyalty program, where the service provider manages the distribution of reward tokens to users in accordance with the program rules (e.g., reward criteria) configured by the merchant without directly involving the merchant. The service provider can use the smart contract to automatically award users according to their purchasing behavior, e.g., based on transactions with the merchant that are processed through the service provider and monitored for purposes of the merchant's loyalty program, as described above. In this way, embodiments of the present disclosure enable merchants, particularly those who may not have the technical resources or know-how needed to integrate a blockchain into their existing transaction processing systems, to leverage blockchain technology to administer their customer loyalty and rewards programs. As the service provider may provide a common interface for processing user transactions across various merchants and managing different loyalty programs corresponding to these merchants, end users may also benefit from having a one-stop shop for a variety of loyalty programs.

Blockchain Overview

In its broadest sense, the term "blockchain" refers to a framework that supports a trusted ledger that is stored, maintained, and updated in a distributed manner in a peer-to-peer network. For example, in a cryptocurrency application, such as Bitcoin (BTC) or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. (Note that other digital asset transfers are enabled by other blockchain schemes as well; cryptocurrency examples are used variously herein for ease of illustration and understanding.) The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger. Many uses of blockchain distributed ledgers other than cryptocurrency are possible, of course, as further discussed below.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser. Other data as well as other digital assets may be maintained, recorded, and/or transferred according to various blockchain schemes.

Implementations of the present disclosure will now be described in detail with reference to the accompanying figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. The distributed ledger may be used to maintain any number of blockchain transactions. FIG. 1 shows an example of a distributed computing system 100 for facilitating blockchain based transactions. As will be described in further detail below, such transactions may include transactions involving the transfer of digital tokens as part of a loyalty program facilitated by a service provider on behalf of the merchants and users. The service provider may be, for example, a payment service provider that manages the distribution of tokens to any user who satisfies the reward criteria configured by a merchant for its loyalty program based on the user's payment transactions with the merchant.

As shown in the example of FIG. 1, system 100 includes a client device 110 of a user 115, a client device 120 of a user 125, a server 150, a server 160, and an Internet of Things (IoT) device 170 interconnected via a network 140. Each of client devices 110 and 120 may be any of various computing devices including at least one processor and a memory. Examples of such a computing device include, but are not limited to, a mobile phone, a tablet computer, a laptop computer, a desktop computer, or a workstation. Each of servers 150 and 160 may be any of various types of computer servers, e.g., a cluster of computers in a server farm, capable of serving data to other computing devices, including client devices 110 and 120, via network 140. Network 140 may be any of a variety of available networks, such as the Internet, and may represent, for example, a worldwide collection of networks and network devices (e.g., gateways) that support communications between devices connected to the network 140. IoT device 170 may be any of various devices with connectivity hardware to connect and exchange data with other IoT devices. Examples of such IoT devices include, but are not limited to, vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, point-of-sale (POS) devices, and stationary and mobile communication devices.

In some embodiments, system 100 may also include one or more distributed or peer-to-peer (P2P) networks, such as blockchain networks 145a, 145b, and 145c (collectively referred to herein as "blockchain networks 145"). As shown in FIG. 1, blockchain networks 145a and 145b may be public blockchain networks included within network 140. By contrast, blockchain network 145c may be a separate private blockchain network connected to server 150. The private blockchain network and server 150 may be located, for example, in a private domain associated with the service provider described above. The service provider in this example may use server 150 to facilitate various blockchain based transactions involving the transfer of funds between a digital wallet of the service provider and digital wallets corresponding to various blockchain users, e.g., users 115 and 125 of client devices 110 and 120, respectively. Users 115 and 125 may be, for example, registered users of the service provider. Thus, the service provider may use a database 155 to store account information in association with unique identifiers for each user. Database 155 may be, for example, a database system for storing information accessible to server 150. An example of a database system (1220) will be described in further detail below with respect to FIG. 12.

A blockchain based transaction may involve, for example, a transfer of data or cryptocurrency between the service provider and the different entities or users, such as user 115 of client device 110 and user 125 of client device 120 in FIG. 1. Each of the servers 150 and 160 may include one or more applications configured to facilitate transactions between the entities by utilizing a blockchain associated with one of the blockchain networks 145. Server 160 in this example may be associated with a merchant and may include a marketplace application that the merchant may use to conduct electronic or online transactions involving the sale of various products to different users, e.g., users 115 and 125. Accordingly, the blockchain based transaction in this example may involve the transfer of a digital token as a reward to a cryptocurrency wallet of a user who has satisfied the reward criteria configured by the merchant for its loyalty program, as described above and as will be described in further detail below.

In another example, the first user 115 may request or initiate a blockchain based transaction with the second user 125 via a user application executing on the first client device 110. The transaction may be related to a transfer of value or data from the first user 115 to the second user 125. In some embodiments, the transaction may be initiated based on a request sent by the server 150 to the first client device 110. The server 150 may also send or broadcast the requested transaction to other nodes in one of the blockchain networks 145 to be validated and approved, as will be discussed further below. Each blockchain network 145 in this example may comprise a plurality of interconnected devices (or nodes), as will be described in more detail with reference to FIG. 2. As discussed above, a ledger or blockchain, is a distributed database for maintaining a growing list of records comprising any type of information. A blockchain, as described in more detail with reference to FIG. 3, may be stored at multiple nodes (or devices) of the one or more blockchain networks 145.

Blockchain Network

Figure 2:
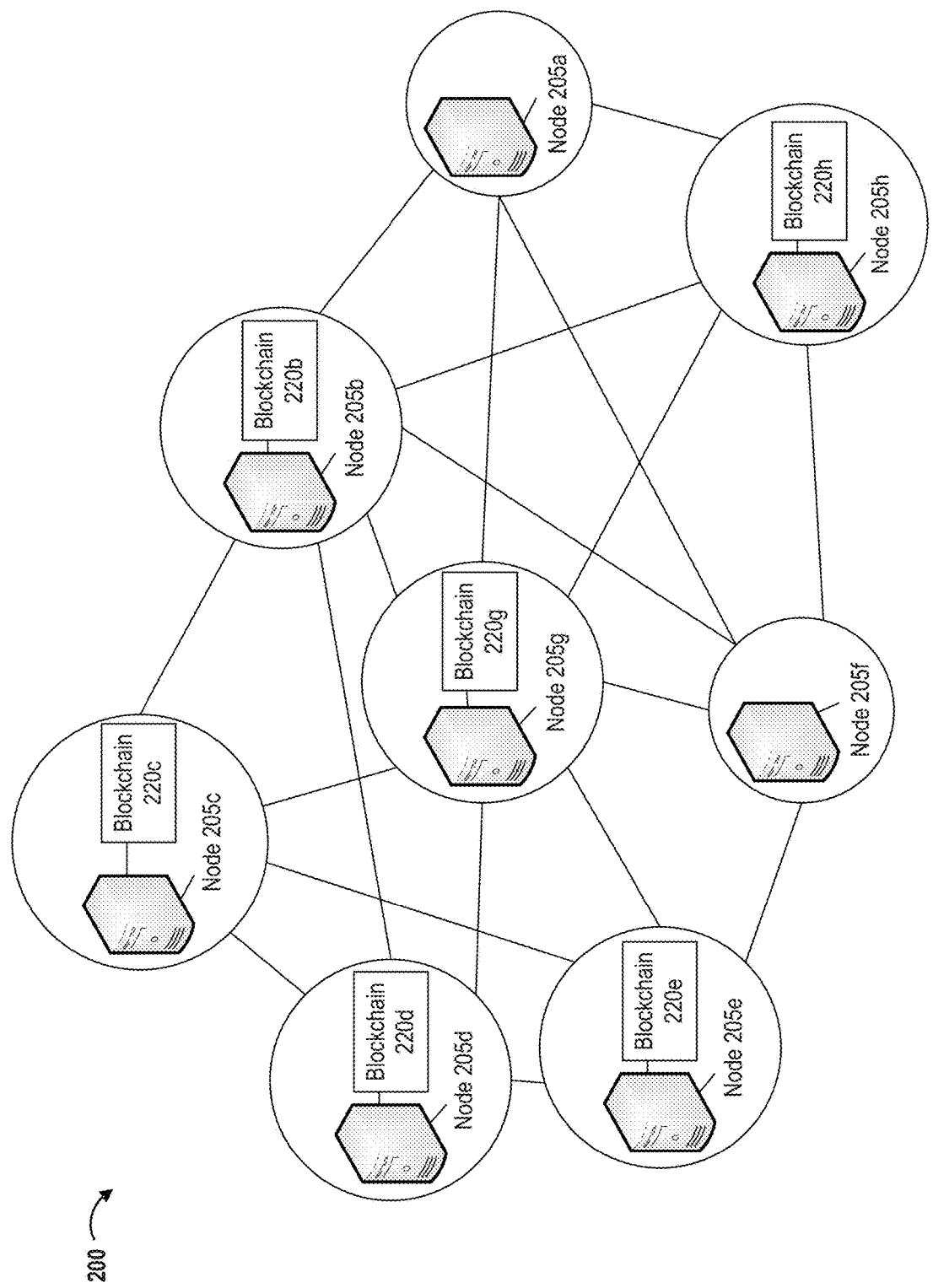
FIG. 2 is a block diagram illustrating an example of a blockchain network.
Figure 3:
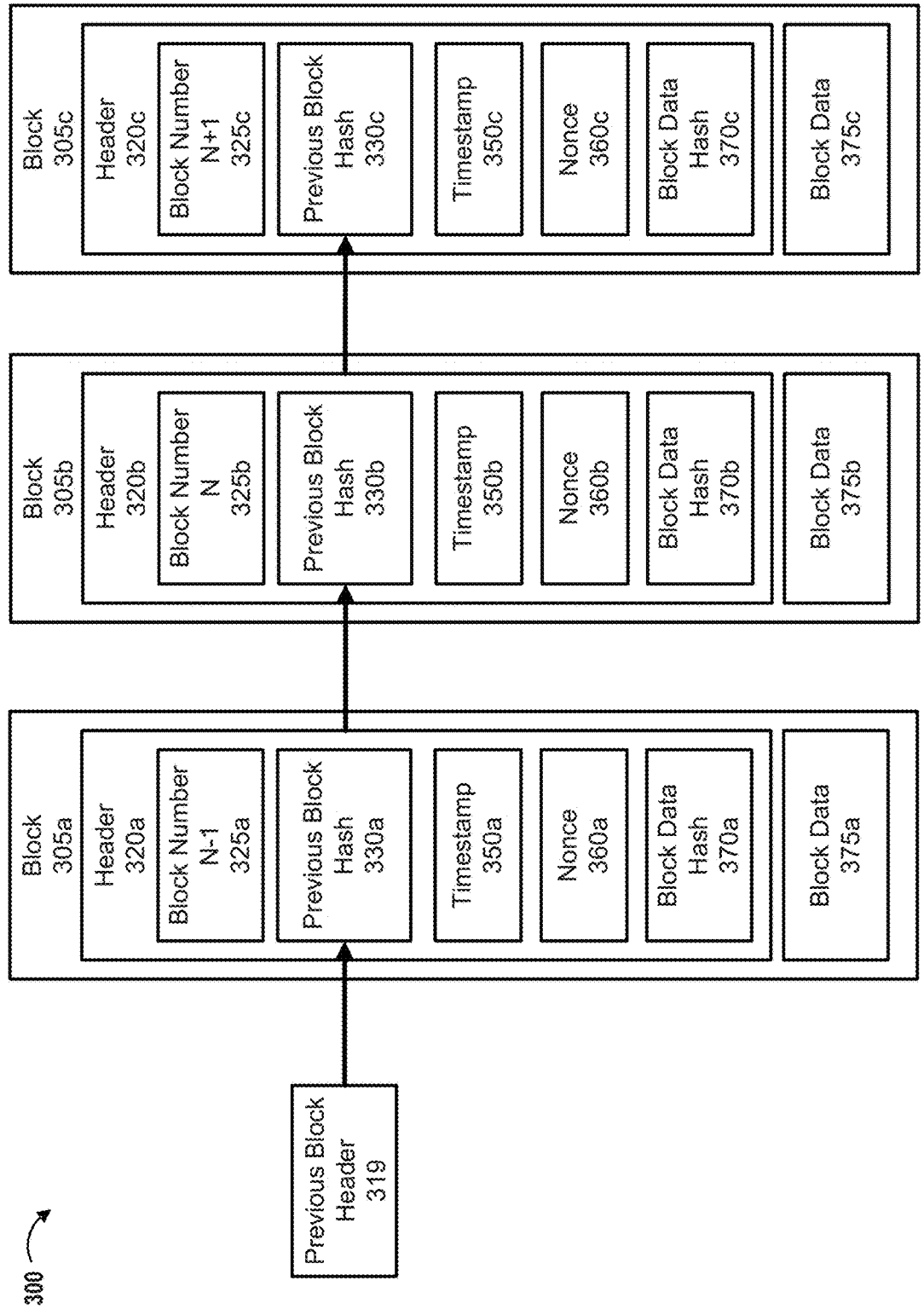
FIG. 3 is a block diagram illustrating an example of a blockchain.

FIG. 2 shows an example blockchain network 200 comprising a plurality of interconnected nodes or devices 205a-h (generally referred to as nodes 205). Each of the nodes 205 may comprise a computing device, such as computing device 1500 of FIG. 15, as will be described below. Although FIG. 2 shows a single device, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 3 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain Example

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N-1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N-1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain network 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, each of servers 150 and 160 may include one or more applications, for example, a transaction application configured to facilitate a blockchain transaction between entities. The entities may include users, devices, etc. The first user 115 may request or initiate a transaction with the second user 125 via a user application executing on the first client device 110. The transaction may be related to a transfer of value or data from the first user 115 to the second user 125. The value or data may represent money, a contract, property, records, rights, status, supply, demand, alarm, trigger, or any other asset that may be represented in digital form. The transaction may represent an interaction between the first user 115 and the second user 125.

Figure 4:
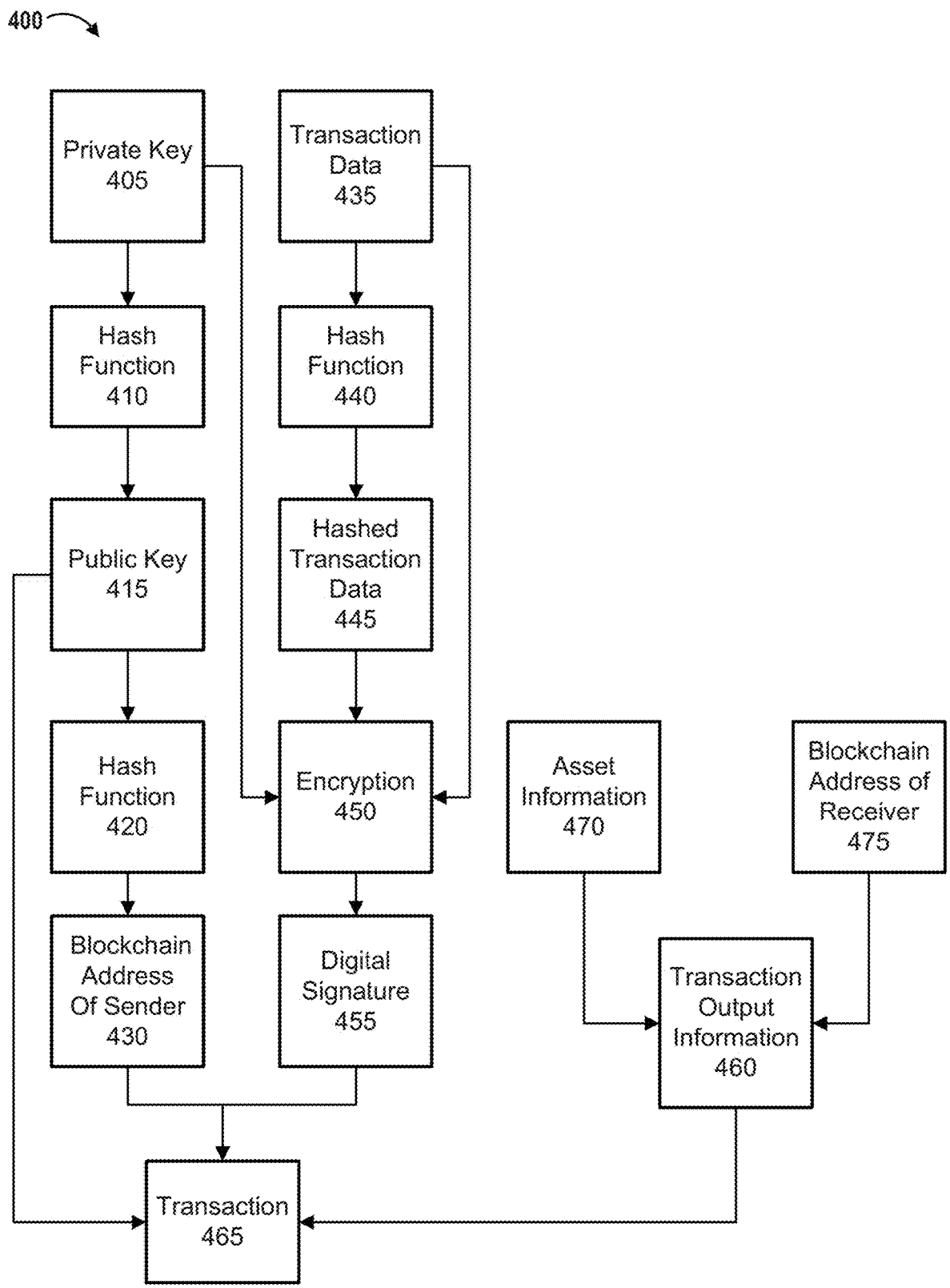
FIG. 4 is a diagram illustrating an example of a blockchain based transaction.

FIG. 4 is a diagram of a transaction 465 generated by the transaction application. The transaction 465 may include a public key 415, a blockchain address 430 associated with the first user 115, a digital signature 455, and transaction output information 460. The transaction application may derive a public key 415 from a private key 405 of the first user 115 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 115, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 115 is the originator of the transaction 465, the transaction application may generate the digital signature 455 for the transaction data 435 using the private key 405 of the first user 115. The transaction data 435 may include information about the assets to be transferred and a reference to the sources of the assets, such as previous transactions in which the assets were transferred to the first user 115 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 115 resulting in the digital signature 455. The transaction output information 460 may include asset information 470 and an address or identifier for the second user, such as the blockchain address 475. The transaction 465 may be sent from the first client device 110 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 115 of FIG. 1, shown in FIG. 4 as the blockchain address 430 of sender, may include an alphanumeric string of characters derived from the public key 415 of the first user 115 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
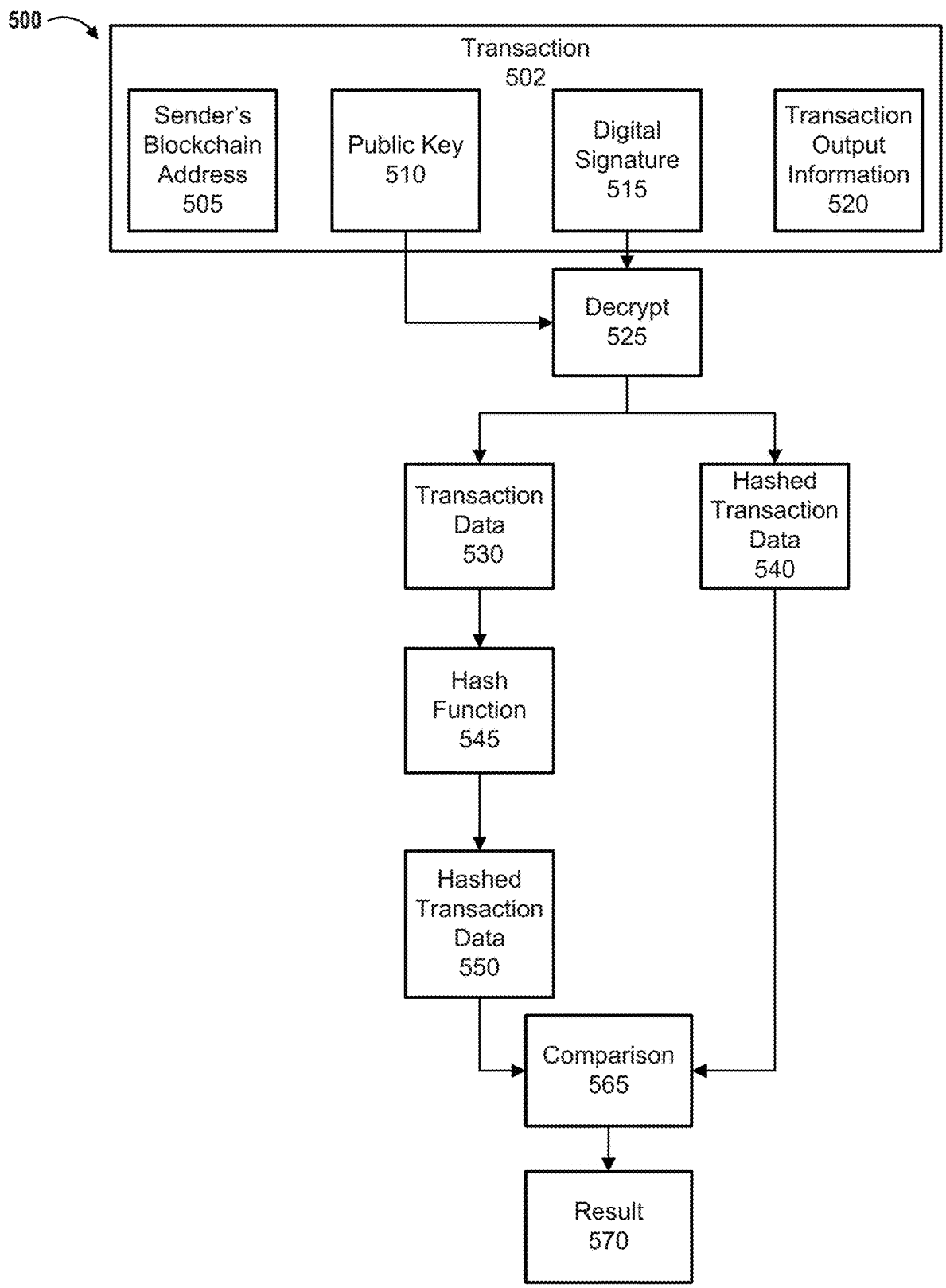
FIG. 5 is a diagram illustrating an example of a transaction broadcasted to the blockchain network.

Referring back to FIG. 1, the server 150 may receive transactions from users of a blockchain network, e.g., blockchain network 145a. The transactions may be submitted to the server 150 via desktop applications, smartphone applications, digital wallet applications, web services, or other software applications. The server 150 may send or broadcast the transactions to the blockchain network 145a. FIG. 5 shows an example of a transaction 502 that has been broadcasted or relayed by the server 150 to the blockchain network 145a. The transaction 502 may be broadcast to multiple nodes 205 of the blockchain network 145a. Typically, once the transaction 502 is broadcasted or relayed to the blockchain network 145a, it may be received by one or more of the nodes 205. Once the transaction 502 is received by the one or more nodes 205 of the blockchain network 145a, it may be propagated by the receiving nodes 205 to other nodes 205 of the blockchain network 145a.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation— User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 115 is the originator of the transaction 465 by including the digital signature 455.

The node 205 may decrypt (at 525) the digital signature 515 using the public key 510. A result of the decryption 525 may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205*f* may create a first block comprising transactions "A," "B," and "C." Another full node 205*b* may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 145.

In a proof of work consensus model, a node validates a transaction, for example, by running a check or search through the current ledger stored in the blockchain. The node will create a new block for the blockchain that will include the data for one or more validated transactions (see, e.g., block data 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue the return causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as a the blockchain 145a in FIG. 1. Bitcoin is one example of cryptocurrency, however there are several other cryptocurrencies. Various encryption techniques may be used for creating the units of cryptocurrency and verifying transactions. As an example, the first user 115 may own 10 units of a cryptocurrency. The blockchain 145a may include a record indicating that the first user 115 owns the 10 units of cryptocurrency. The first user 115 may initiate a transfer of the 10 units of cryptocurrency to the second user 125 via a wallet application executing on the first client device 110. The wallet application may store and manage a private key of the first user 115. Examples of the wallet device include a personal computer, a laptop computer, a smartphone, a personal data assistant (PDA), etc.

Figure 6A:
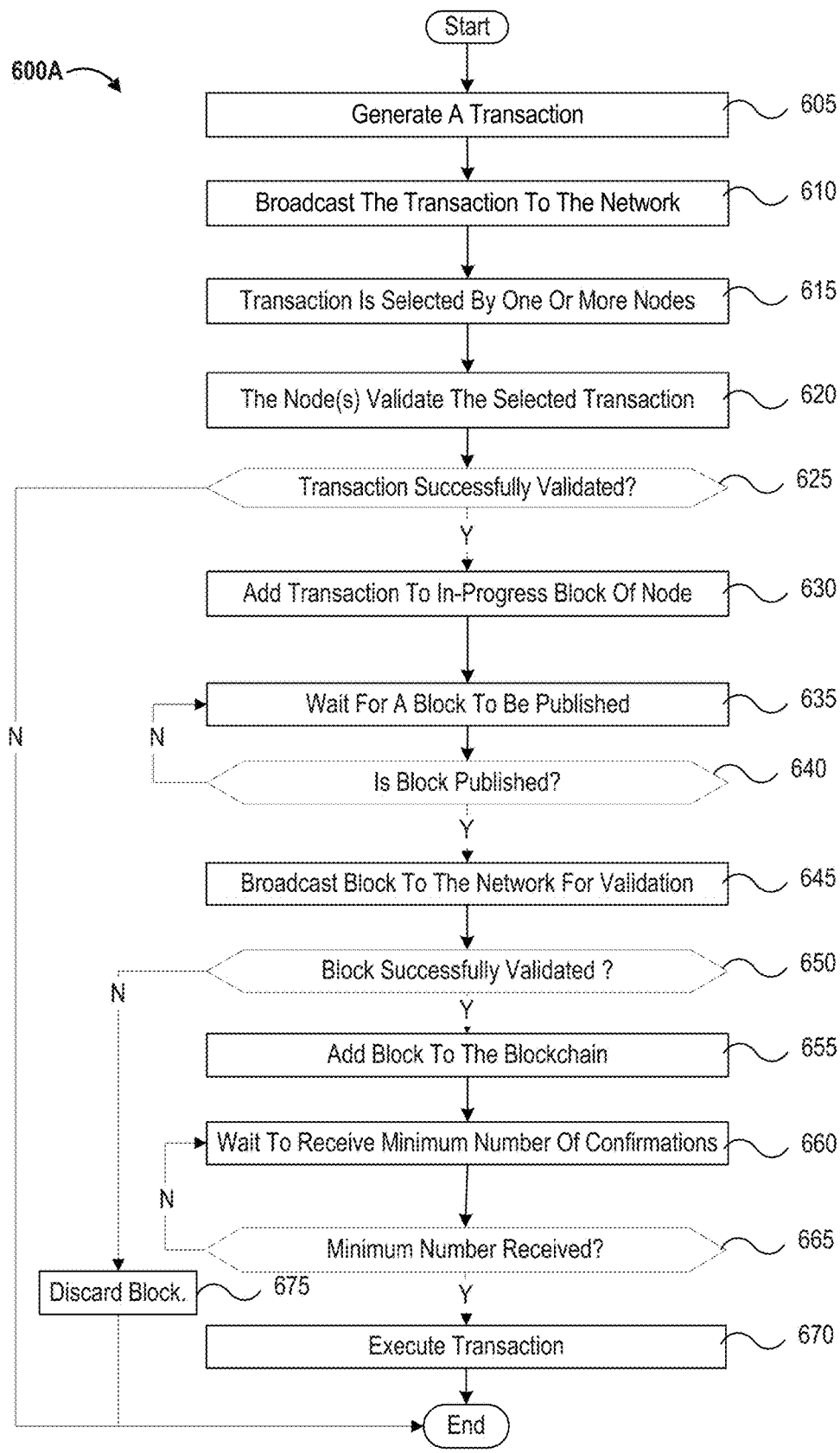
FIG. 6A is a flow diagram of an example process for performing a blockchain based transaction.

FIG. 6A is a flow diagram showing steps of an example process 600A for performing a blockchain transaction between entities, such as the first user 115 of the first client device 110 and the second user 125 of the second client device 120 in FIG. 1. The steps of the process 600A may be performed by any of the computing devices shown in FIG. 1. Alternatively or additionally, some or all of the steps of the process 600A may be performed by one or more other computing devices. Steps of the process 600A may be modified, omitted, and/or performed in other orders, and/or other steps added.

At step 605, the wallet application may generate transaction data for transferring the 10 units of cryptocurrency from the first user 115 to the second user 125. The wallet application may generate a public key for the transaction using the private key of the first user 115. In order to indicate that the first user 115 is the originator of the transaction, a digital signature may also be generated for the transaction using the private key of the first user 115. As discussed with reference to FIG. 4, the transaction data may include information, such as a blockchain address 430 of the sender, the digital signature 455, transaction output information 460, and the public key 415 of the sender. The transaction data may be sent to the server 150 from the first client device 110.

The server 150 may receive the transaction data from the first client device 110. At step 610, the server 150 may relay or broadcast the transaction to the blockchain network 145a. The transaction may be received by one or more nodes 205 of the blockchain network 145a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first user 115 transferring 10 units of cryptocurrency to the second user 125 may be included in some blocks and not others.

At step 635, the blockchain network 145a may wait for a block to be published. Validated transactions may be added to the block being assembled by a node 205 until it reaches a minimum size specified by the blockchain. If the blockchain network 145a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 115). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining" At step 640, if a block has not been published, then the process 600A returns to step 635 and waits for a block to be published. However, at step 640, if a block has been published, then the process 600A proceeds to step 645.

At step 645, the published block is broadcast to the blockchain network 145a for validation. At step 650, if the block is validated by a majority of the nodes 205, then at step 655, the validated block is added to the blockchain 220. However, at step 650, if the block is not validated by a majority of the nodes 205, then the process 600A proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 115 may be transferred to the second user 125. For example, the 10 units of cryptocurrency owned by the first user 115 may be transferred from a financial account of the first user 115 to a financial account of the second user 125 after the transaction receives at least three confirmations.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, a ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the token(s) at the address. Thus, the blockchain address may represent an identity of the person that owns the token(s). Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user. In some embodiments, the tokens may be distributed to users as incentives as part of a loyalty or rewards program associated with an entity or organization, e.g., a merchant. The tokens associated with the entity's loyalty program may be distributed to users who satisfy reward criteria configured by the entity. In some implementations, the loyalty program may be managed by a service provider that provides an interface for the entity to configure the reward criteria for different categories of tokens. Examples of such categories include, but are not limited to, promotional badges, collectibles, cryptocurrency, and loyalty points. The tokens in each category may have different properties configured by the entity. In some embodiments, the token properties may include a token type and a transferability status. Examples of different types of tokens that may be configured for such a loyalty program include, but are not limited to, fungible tokens, non-fungible tokens (NFTs), and semi-fungible tokens.

Different token standards may be used to define standard interfaces for different types of tokens on a decentralized blockchain. For example, tokens on the Ethereum blockchain may be implemented according to the ERC-20 standard for fungible tokens, the ERC-721 standard for non-fungible tokens, the ERC-994 standard, the ERC-998 standard, the ERC-1155 standard for semi-fungible tokens, and/or any other token standard configured for the Ethereum blockchain network or other blockchain network that includes a virtual machine for executing contract bytecode on its blockchain, as would be apparent to one of skill in the art in possession of the present disclosure. As would be apparent to one of skill in the art in possession of the present disclosure, a fungible token is a token that is indistinguishable from another token of the same type while a non-fungible token (NFT) is a unique token that can be distinguished from another token. A token that implements the ERC-994 standard and the ERC-994 standard may be considered non-fungible and may be hierarchical with other tokens that implement the ERC-994 standard. In other words, the tokens may form a tree-like structure of parent/child NFTs. In yet other examples, tokens that implement the ERC-1155 standard may be minted from a single smart contract, rather than a smart contract for each token as is required in many of the other standards. As such, a smart contract that implements the ERC-1155 standard may be used to generate both non-fungible and fungible tokens.

Smart Contracts

A smart contract as discussed herein is an agreement that is stored in a blockchain and automatically executed when the agreement's predetermined terms and conditions are met. The terms and conditions of the agreement may be visible to other users of the blockchain. When the predefined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain. In some embodiments, such a smart contract may be generated for implementing different categories of tokens and broadcasting transactions to the blockchain for transferring selected tokens from one or more of these categories to digital wallets of respective users in accordance with reward criteria or rules configured by an entity for an on-chain loyalty program associated with the entity, as described above.

As an example, referring back to system 100 of FIG. 1, the first user 115 (or tenant 115 in this example) may rent an apartment from the second user 125 (or landlord 125 in this example). A smart contract may be utilized between the tenant 115 and the landlord 125 for payment of the rent. The smart contract may indicate that the tenant 115 agrees to pay next month's rent of $1000 by a specified date (e.g., the 28th of each month). The agreement may also indicate that if the tenant 115 pays the rent on time for at least three consecutive months, then the landlord 125 provides the tenant 115 with a non-fungible token (NFT) that may be redeemed for exclusive access (or a digital access key) to private areas, e.g., a private clubhouse, of the apartment complex. The agreement may also indicate that if the tenant 115 pays the rent by the 28th of each month within the three-month period, then on the last day of the third month, both the NFT and a digital access key are released to a designated device (e.g., client device 110 of FIG. 1, as described above) of the tenant 115.

Figure 6B:
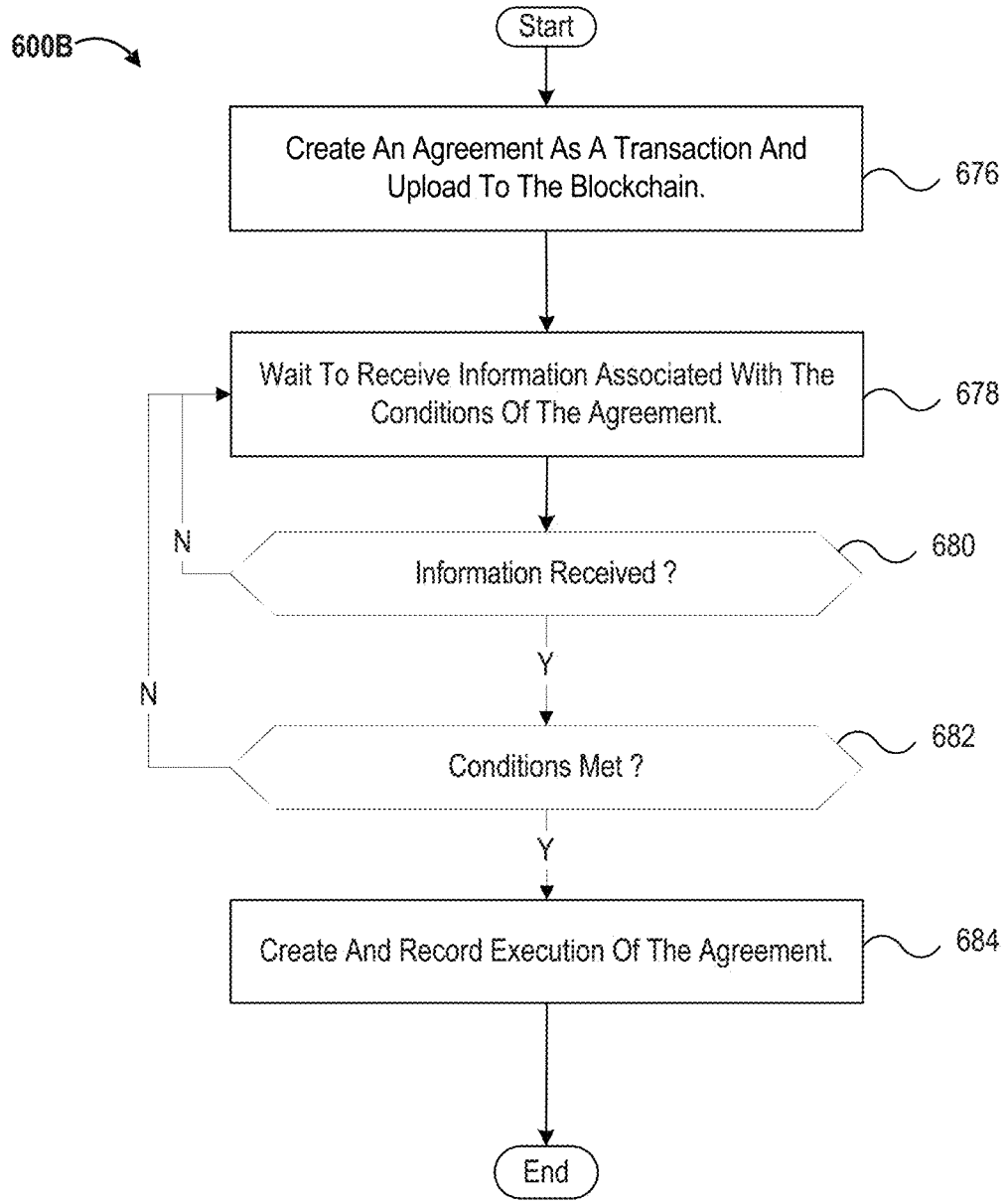
FIG. 6B is a flow diagram of another example process for performing a blockchain based transaction.

FIG. 6B is a flow diagram showing steps of an example process 600B for performing a smart contract transaction between entities, such as the tenant 115 and the landlord 125. The steps of the process 600B may be performed by any of the computing devices shown in FIG. 1. Additionally or alternatively, some or all of the steps of the process 600B may be performed by one or more other computing devices. Steps of the process 600B may be modified, omitted, and/or performed in other orders, and/or other steps added.

At step 676, the agreement or smart contract between the tenant 115 and the landlord 125 may be created and then submitted to the blockchain network 145*a* as a transaction. The transaction may be added to a block that is mined by the nodes 205 of the blockchain network 145*a*, the block comprising the transaction may be validated by the blockchain network 145*a* and then recorded in the blockchain 220 (as shown in steps 610-655 in FIG. 6A). The agreement associated with the transaction may be given a unique address for identification.

At step 678, the process 600B waits to receive information regarding the conditions relevant for the agreement. For example, the process 600B may wait to receive notification that $1000 was sent from a blockchain address associated with the tenant 115 and was received at a blockchain address associated with the landlord 125 by the 28th of the current month. At step 680, if such a notification is not received, then the process 600B returns to step 678. However, if at step 680, a notification is received, then the process 600B proceeds to step 682.

At step 682, based on determining that the received notification satisfies the conditions needed to trigger execution of the various terms of the smart contract, the process 600B proceeds to step 684. However, at step 682, if it is determined that the received notification does not satisfy the conditions needed to trigger execution of the smart contract, then the process 600B returns to step 678. At step 683, the process 600B creates a transaction associated with execution of the smart contract. For example, the transaction may include information of the payment received, the date the payment was received, an identification of the tenant 115 and an identification of the landlord 125. The transaction may be broadcast to the blockchain network 145*a* and recorded in the blockchain 220 (as shown in steps 610-655 of the process 600A of FIG. 6A). If the transaction is successfully recorded in the blockchain 220, the transaction may be executed. For example, if the payment was received on the 28th of each month within the three-month period of the landlord 125's reward program as described above, then an NFT and/or a digital access key may be generated and sent to a device of the tenant 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information, or may even go out of business.

Since blockchains are immutable, amending or updating a smart contract that resides in a blockchain may be challenging and thus, more expensive and/or more restrictive than with text-based contracts.

In some embodiments, a smart contract associated with an entity's on-chain loyalty program, as described above, may include a programmable grammar-based syntax for implementing different categories of tokens with varying token properties. The token properties for each category may be configured, for example, according to the reward criteria specified by the entity via an interface provided for the on-chain loyalty program. The configurable properties of the tokens in each category may include a token type and a transferability status. The different token types for each category may include, for example, fungible tokens, non-fungible tokens, and semi-fungible tokens, as implemented using the appropriate token standards described above. The transferability status of each token may specify whether the token is transferrable or non-transferrable.

FIG. 7 illustrates an example of a programmable grammar-based syntax for implementing a non-fungible token (NFT) 700 using a smart contract associated with an on-chain loyalty program. While the token in this example is an NFT, it should be appreciated that embodiments are not limited thereto and that the programmable grammar-based syntax described herein may be appropriately adapted for implementing other types of tokens and token standards as desired for a particular implementation. Also, while the programmable grammar-based syntax as shown for NFT 700 in FIG. 7 is written in JavaScript Object Notation (JSON), it should be appreciated that embodiments are not intended to be limited thereto and that any of various programming or scripting languages may be used as desired for a particular implementation. Unlike a tag-based token standard, the programmable grammar-based syntax in this example may include a set of fields for defining various attributes of NFT 700 that relate to its usage, particularly with respect to "who," "what," and "how" to ensure that NFT 700 includes the appropriate function definitions for different use cases. For example, the identification field 702 and the certificate field 704 may prove the identity of the entity (e.g., "who") associated with or that owns the NFT 700. In a specific example, the entity that owns the NFT 700 may be "ML_23", as provided in the identifier field 702 and the certificate field 704 may include the digital certificate for the entity.

The permit field 706, the shareable field 708, and the object field 714 may state what the identified entity is allowed to do or can do and also what conditions the entity is subjected to such as conditions that need to be satisfied before the actions are to be allowed. For example, if the NFT 700 is owned by a visitor of an amusement park, the permit field 706 may identify which parks the visitor has access to, which rides the visitor can ride, which days the visitor has access, and/or other permissions and conditions for those permissions. In the illustrated example, the entity may have permissions to "room 0077", "computer 0011", APIs "data_file_000aa_access", "data_field_0055_update", "data_field_0023_view", and data "file_00aa", "field_0055", "field_0023", and so on. Furthermore, the data that can be shared is in the sharable field 708 and other conditions for the permissions of sharing may be limited to "not after 1800 hr." The permit field 706 may be signed by the owner of the NFT 700, which authenticates the identified entity's access and authorization to the data, executable instructions, and/or other resources. In some embodiments, the conditions may correspond to reward criteria configured by an entity, e.g., a merchant, via an interface of an on-chain loyalty program, as described above and as will be described in further detail below.

In various embodiments, the subject field 710 and the interface field 712 may describe the "how" attribute, which may describe the protocols and means that the permitted actions are subject to. In the illustrated example, the QR code may be needed to unlock the NFT 700 or otherwise access the permitted actions. The NFT 700 may also include a signature 716 that is signed by private key and/or public key that is associated with the owner of the non-fungible token. The key usage should be clearly defined. According to A6 (Authentication, Attestation, Authorization, Access, Audit, and data Assertions), there may be six different forms of keys. The keys may also come in the form of a non-fungible token j son format promising what it is used for and at what condition. As such, the key may be a new form of an X509 digital certificate, but with extension of formats indicating the contractual conditions and contextual usage of the key. Even the definition of key lifecycle and the state the key is currently in the lifecycle can be embedded in the non-fungible 700 as a form of contractual permit.

The NFT 700 may need to be resigned and repackaged for authentication of the NFT 700 when any of the fields are updated. For example, the owner may update the shareable field 708 to add/change: data, executable instructions, entities that have access to the shareable field 708, tokens, smart contracts that can access the shareable field 708 or that the NFT 700 can access, conditions, and/or any other updates to the NFT 700 or portion of the NFT 700. As discussed above, ERC-xxxs are fixed standards of defined functions, and if users keep adding, these conventional token standards will become redundant. The grammar-based syntax of the NFT 700 are standardized in formal notations, and grammar-based syntax are only recommended to be extensible when normalized after peer review (this can be also reached a voting consensus via non-fungible token proposal and canonization). The NFT 700 can encapsulate the definition and expected behavior of the operators and operations. It is also in the definitions that the non-fungible token can be subjected under/during operations (e.g., embedded code-signed scripts or binaries).

In some implementations, an owner of NFT 700 (or service provider on behalf of the owner) may edit or update one or more programmable sections of the grammar-based syntax associated with NFT 700. For example, any portion of the data or instructions (e.g., APIs) in the shareable field 708 of NFT 700, which may be shared with third parties (or non-owners) may be defined or changed. For example, the data "field_0055" may be added to the shareable field 708 to share that data with any of the shared parties identified by the digital certificates, which may also be added or removed. The NFT 700 with the updated data and/or updated instructions may then be repackaged and re-signed by the owner. For example, the signature 716 of NFT 700 may be changed or updated based on the changes made in one or more fields. The updated NFT 700 may then be stored at a blockchain address of the next block in the blockchain.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

In some embodiments, the IoT devices, e.g., POS devices, associated with an entity, e.g., a merchant, may be used to monitor transactions between the entity and different users as part of a loyalty program associated with the entity. A service provider, e.g., a payment service provider, associated with the entity may provide an automated platform for managing the loyalty program for the entity on a decentralized blockchain. Such an on-chain loyalty program management platform may receive transaction information collected by IoT devices associated with the entity via an application programming interface (API) of the service provider. For example, a payment service provider may use an API for a merchant to monitor transactions between the merchant and different customers based on information collected by POS devices at retail locations of the merchant. The service provider may use the monitored transactions to track the purchasing behavior of individual customers/users and determine whether any of these users have satisfied at least one condition or reward criterion (e.g., spent over a predetermined amount in a given month) associated with the loyalty program. As described above, the reward criteria associated with the program may be configured by the merchant via a merchant interface provided by the service provider. The determination that at least one user has satisfied the reward criteria may trigger the execution of a smart contract to select at least one token from among a plurality of tokens (or token categories, as described above) for the user. The smart contract in this example may be generated by the automated platform based on the reward criteria configured by the merchant via the merchant interface.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed, and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives. In some embodiments, the promotions or incentives may be based on the types of tokens distributed to a user's digital wallet as part of a loyalty program, as described above. For example, a merchant may decide to award fungible or semi-fungible tokens representing promotional badges that return customers may redeem for discounts on future purchases of a product (e.g., milk) sold by the merchant. Different promotional badges (e.g., Silver vs. Gold customer badges) may correspond to different levels of a tiered loyalty program, where the badges at relatively higher levels allow the merchant to offer relatively greater discounts. In some implementations, the tokens may include semi-fungible tokens that have an internal state, e.g., a Boolean value representing an award that may be redeemed only one time or an integer value representing a balance of points that may be redeemed multiple times before the balance reduces to zero.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 6A and 6B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain. As will be described in further detail below with reference to FIGS. 10 and 11, one or more smart contracts may be utilized by a service provider to manage on-chain loyalty programs for different entities, e.g., merchants or other entities along the supply chain.

As an example, a permissioned blockchain may be utilized for recording and monitoring the activities between different entities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned, and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse. The smart contract in this example may be associated with an on-chain loyalty program managed by the service provider for the farmer based on reward criteria or rules configured by the farmer and used to generate conditions that trigger execution of the smart contract, as described above. The smart contract may be triggered, for example, to award the warehouse owner with tokens representing special incentives or promotional discounts to drive sales of certain fruits grown by the farmer during certain seasons of the year.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, a first user, e.g., user 115 of FIG. 1, as described above. An insurance provider in this example may determine that the accident may have been caused by a defective component used in a wheel of the automobile. The insurance provider may wish to trace a provenance of the component based on information recorded in the permissioned blockchain. The insurance provider may query the blockchain data for information related to the component via, for example, a blockchain querying application executing on a device of the insurance provider. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Figure 8:
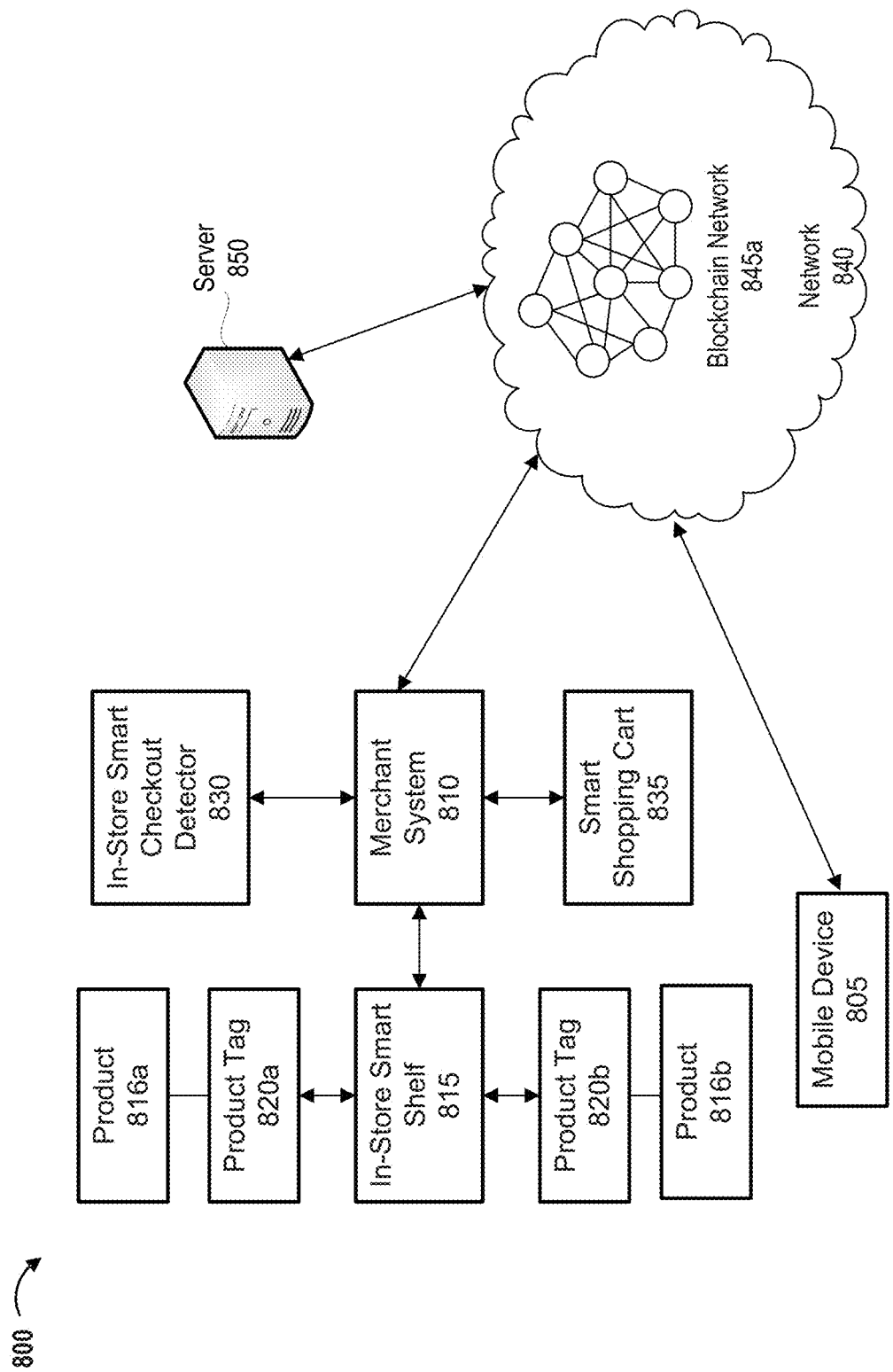
FIG. 8 is a block diagram illustrating an example of a blockchain enabled in-store purchase system.

As a Further Example, the Blockchain May be Used to Store a Smart Contract that Specifies Reward Criteria for a Safe Driving Program Configured by the Insurance Provider to Award Policy Holders, Such as User 115, with Incentives for Maintaining a Safe Driving Record. As Described Above with Respect to FIG. 7, the Smart Contract May Include a Programmable Grammar-Based Syntax for Implementing Different Categories of Tokens with Token Properties that Vary According to the Reward Criteria Configured by the Insurance Provider for Each Category. As Described Above, the Token Properties for Each Category May Include a Token Type and a Transferability Status. The Different Token Types for Each Category May Include, for Example, Fungible Tokens, Non-Fungible Tokens, and Semi-Fungible Tokens. Thus, in the Safe Driving Program Example, the Incentives May Include a Non-Transferrable Nft Representing a Safe Driving Badge that a Policy Holder can Redeem for Discounted Auto Insurance Rates. The Reward Criteria for the Safe Driving Badge May Require the Policy Holder to Maintain a Safe Driving Record for a Period of at Least Twelve Months. Blockchain Enabled In-Store Purchasing An example of blockchain enabled in-store purchasing is described with reference to the system 800 shown in FIG. 8, the process 600A shown in FIG. 6A and the process 600B shown in FIG. 6B. FIG. 8 illustrates an example of a blockchain enabled in-store purchase system 800. The system 800 includes a mobile device 805, a merchant system 810, and a server 850 connected via a network 840. The merchant system 810 may be connected via a local wireless network to various IoT devices within a store, for example, an in-store smart shelf 815, and an in-store smart checkout detector 830.

In some embodiments, the server 850 may be associated with a payment service provider that processes payment transactions between the merchant and different users (e.g., shoppers at the merchant's store). In addition to payment processing services, the service provider may use server 850 to manage an on-chain loyalty program for the merchant, which monitors the transactions, e.g., via an API of the service provider for the merchant. The service provider may provide, for example, an automated token platform that uses the monitored transactions to track the purchasing behavior of individual shoppers and automatically distribute selected tokens as rewards to the digital wallet of any shopper who has satisfied at least one of the reward criteria associated with the merchant's loyalty program. The tokens may represent, for example, promotional badges that a shopper may use, e.g., via a wallet application executable on the mobile device 805, to redeem discounts on products purchased from the merchant's store. The reward criteria for these promotional badges may require shoppers to spend a predetermined amount on in-store or online purchases of products sold by the merchant over a specified period (e.g., more than $5,000 or more than $10,000 over 30 days). The merchant's loyalty program may also offer different badges with greater incentives or discounts for shoppers according to their level of spending. For example, shoppers who spend spends than $5,000 in a given month may receive a Silver Customer badge from the merchant while those who spend more than $10,000 may receive a Gold Customer badge. The promotional badges in this example may be implemented as, for example, fungible, non-fungible, or semi-fungible tokens, which are either transferrable or non-transferrable.

As described above, the reward criteria for the program may be configured by the merchant via a merchant interface provided by the service provider, e.g., via a website hosted by server 850 and accessible to merchant system 810 over network 840. A smart contract for implementing tokens representing different reward categories in accordance with the reward criteria configured by the merchant may be stored on a decentralized blockchain associated with a blockchain network 845a. Blockchain network 845a may be implemented using, for example, blockchain network 145a of FIG. 1, as described above.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820a attached to a first product 816a and a second product tag 820b attached to a second product 816b. The in-store smart shelf 815 may, based on reading the product tags 820a and 820b, send information about the products 816a and 816b throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816a. When the shopper is close to the in-store smart shelf 815, the mobile device 805 may notify the shopper that the first product 816a is currently available on the in-store smart shelf 815. The shopper may remove the first product 816a from the in-store smart shelf 815 and place it into a smart shopping cart 835. The smart shopping cart 835 may read the first product tag 820a as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816a, and payment information from the mobile device 805 to the merchant system 810. The merchant system 810 may receive information from the in-store smart checkout detector 830 and the payment information and proceed to initiate purchase of the first product 816a.

Referring to step 605 of the process 600A shown in FIG. 6A, a wallet application on the mobile device 805 may generate transaction data for transferring an amount of cryptocurrency matching the sale price of the first product 816a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 845a. The transaction may be received by one or more nodes 205 of the blockchain network 845a. At step 615 of process 600A, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added, at step 630, to a block being constructed by that node 205. At step 635, the blockchain network 845a may wait for a block to be published. At step 640, if a block has not been published, then the process 600A returns to step 635 and waits for a block to be published. However, at step 640, if a block has been published, then the process 600A proceeds to step 645.

At step 645, the published block is broadcast to the blockchain network 845a for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816a may be transferred from the shopper to the merchant.

When the in-store smart checkout detector 830 sends information about the products, such as the first product 816a, and payment information from the mobile device 805 to the merchant system 810, a smart contract may be created between the shopper and the merchant and executed according to the process 600B shown in FIG. 6B. For example, at step 676, a smart contract between the shopper and the merchant may be created and then submitted to the blockchain network 845a as a transaction. For example, at step 678, the process 600B may wait to receive notification that an amount of cryptocurrency equal to the sale price of the first product 816a was sent from a blockchain address associated with the shopper and was received at a blockchain address associated with the merchant by the time the first product 816a is removed from the smart shopping cart 835. The cryptocurrency may be, for example, a fungible token that was transferred to a digital wallet of the shopper as a reward associated with the merchant's on-chain loyalty program described above. If the payment for the first product 816a was successfully transferred from the shopper to the merchant by the time the shopper removes the first product 816a from the smart shopping cart 835, then an electronic receipt may be generated and sent to the shopper. Otherwise, the merchant system 810 may be alerted that the shopper is attempting to leave the premises without paying for the first product 816a.

Blockchain Enabled In-Vehicle Purchasing

Figure 9:
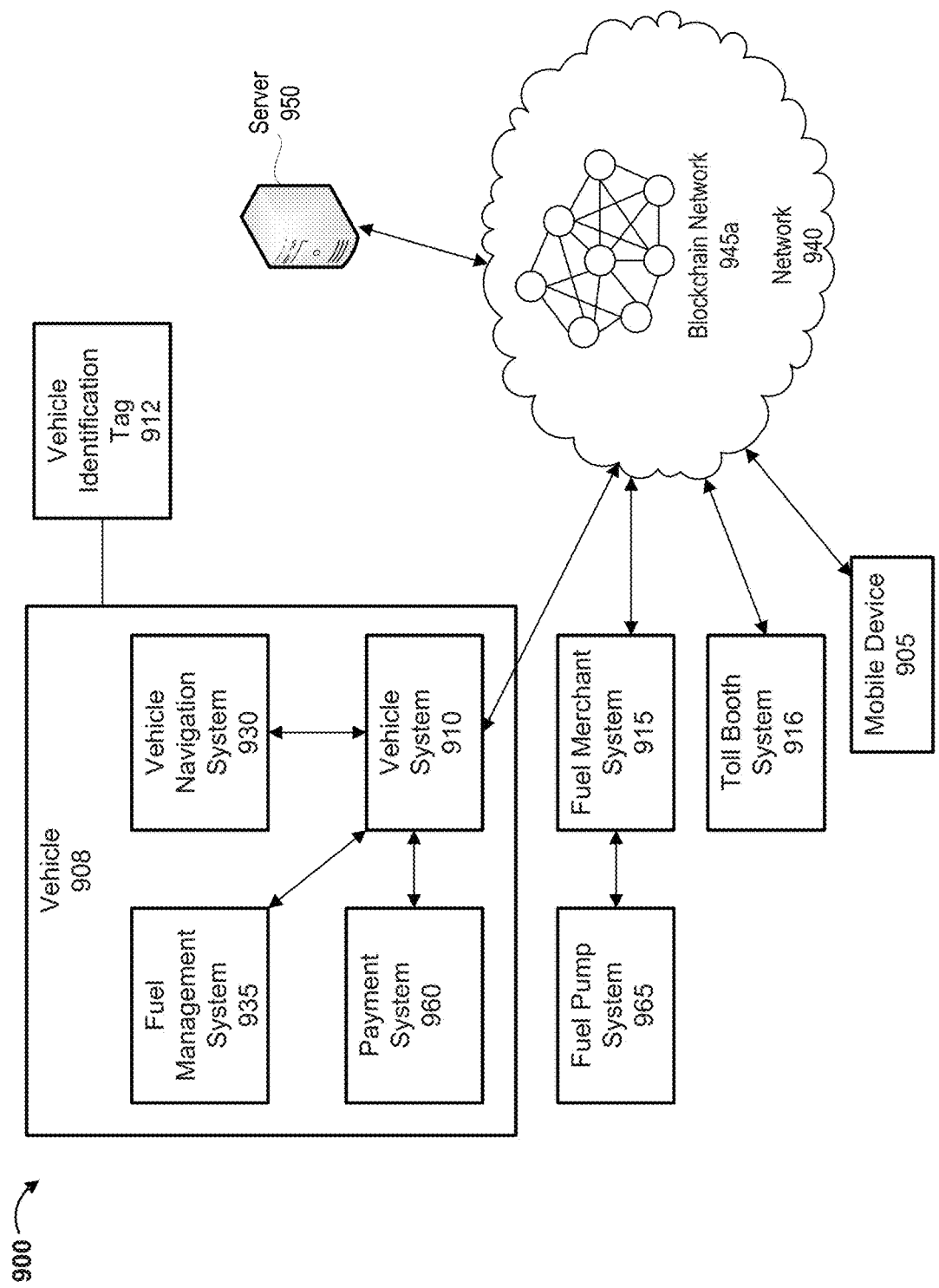
FIG. 9 is a block diagram illustrating an example of communications for an Internet of Things (IoT) blockchain enabled device system.

An example of blockchain enabled in-vehicle purchasing is described with reference to the system 900 shown in FIG. 9, the process 600A shown in FIG. 6A and the process 600B shown in FIG. 6B. FIG. 9 illustrates an example system 900 for blockchain enabled in-vehicle purchasing. The system 900 includes an IoT enabled smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908. The various merchant systems and the mobile device 905 may be communicatively coupled to one another via a network 940. Network 940 may be implemented using, for example, network 140 of FIG. 1, as described above. Network 940 may include at least one blockchain network 945a, e.g., as implemented using blockchain network 145a of FIG. 1, as described above.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with a server 950 to charge the driver for the fuel according to the process 600A shown in FIG. 6A. Additionally, the fuel merchant system 915 may communicate with the server 950 in order to create a smart contract between the driver and the fuel merchant. The smart contract may be created and executed according to the process 600B shown in FIG. 6B.

Like server 850 of FIG. 8, as described above, the server 950 in FIG. 9 may be associated with a payment service provider that processes payment transactions between the fuel merchant and different users (e.g., different drivers, including the driver of vehicle 908). Also, like the service provider associated with server 850, the service provider in this example may use server 950 to manage an on-chain loyalty program for the fuel merchant, where tokens representing redeemable discount coupons or loyalty points may be distributed to drivers who satisfy reward criteria configured by the fuel merchant for the on-chain loyalty program.

In addition to the blockchain enabled in-store purchasing and in-vehicle purchasing examples described above, it should be appreciated that the disclosed on-chain program management techniques may be applied to other types of blockchain based transactions in which reward tokens may be transferred to users who satisfy reward criteria configured by a merchant or other entity as part of an on-chain program sponsored by the merchant or entity.

Loyalty Program Management Using a Decentralized Blockchain

Figure 10:
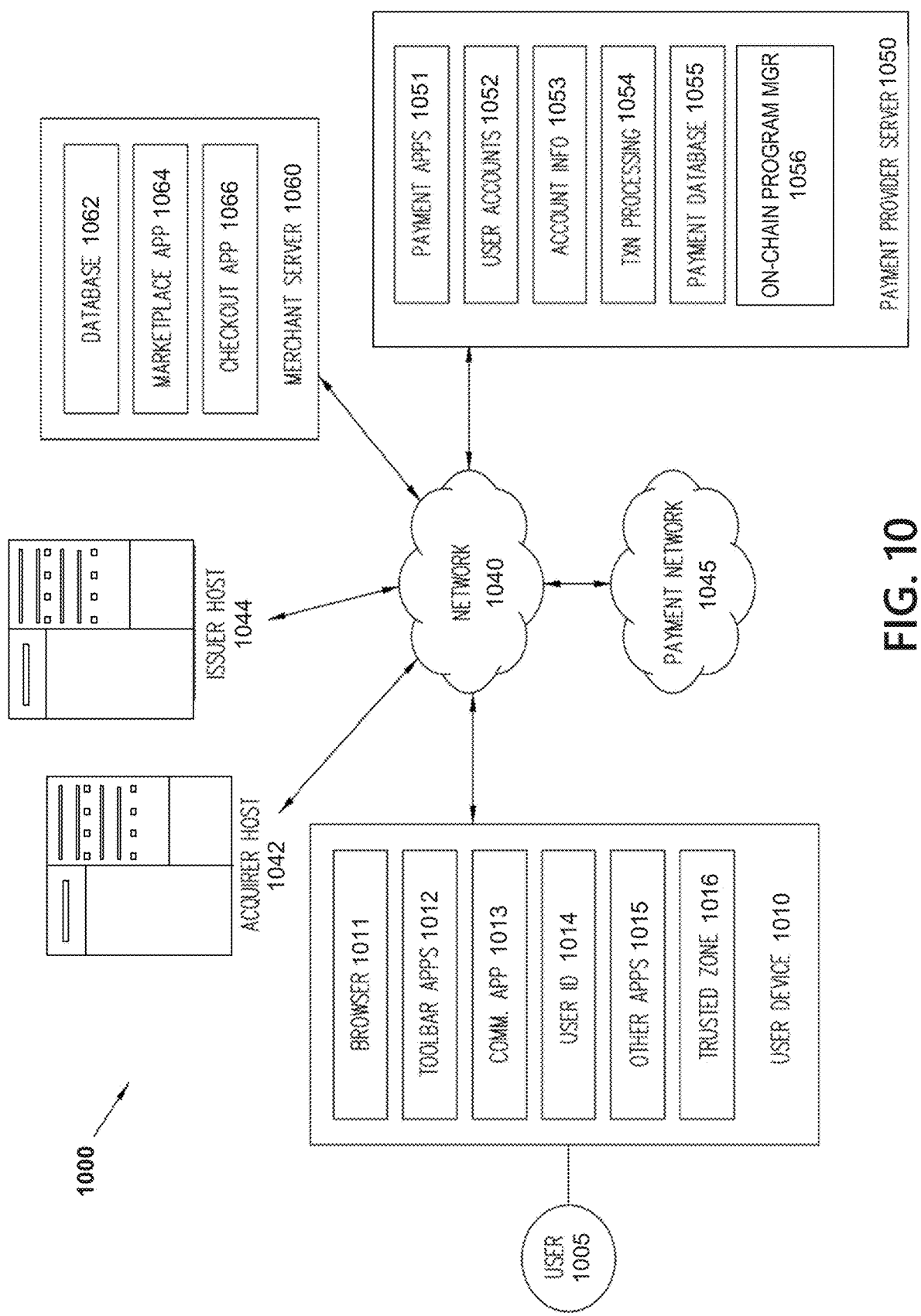
FIG. 10 is a block diagram of an electronic transaction processing system, according to an embodiment of the present disclosure.

FIG. 10 is a block diagram of an electronic transaction processing system 1000, according to an embodiment of the present disclosure. System 1000 may be used to conduct electronic transactions between merchants and users according to the various aspects of the present disclosure. As described above, such transactions may be processed through a service provider, e.g., a payment service provider 1050, which also manages loyalty programs for different merchants on a decentralized blockchain. The operations performed by the service provider for such an on-chain loyalty program may include monitoring the user transactions associated with a merchant to determine whether any users have satisfied reward criteria configured by the merchant via a merchant interface provided by payment service provider 1050 for the merchant's on-chain loyalty program, as will be described in further detail below. The reward criteria may include a set of rules or conditions that the merchant requires users to satisfy to receive fungible, non-fungible, or semi-fungible tokens as rewards that the users can redeem for promotional discounts, exclusive offers, or other incentives, which may be applied to future transactions with the merchant. The tokens may be implemented using a smart contract that includes a programmable grammar-based syntax for configuring properties of the respective tokens in accordance with the reward criteria configured by the merchant, e.g., as described above with respect to NFT 700 of FIG. 7.

As shown in FIG. 10, system 1000 may include a user device 1010, a merchant server 1060, a payment provider server 1050, an acquirer host 1042, an issuer host 1044, and a payment network 1045 that are in communication with one another over a network 1040. It should be appreciated that the devices illustrated in FIG. 10 may be deployed in any of various configurations as desired for a particular implementation and that the operations performed. While not shown in FIG. 10, it should also be appreciated that system 1000 may include any number of additional devices, which may be operated and/or maintained by the same or different entities.

User device 1010, merchant server 1060, payment provider server 1050, acquirer host 1042, issuer host 1044, and payment network 1045 may each include one or more hardware processors, memories, and other appropriate electronic components for executing instructions such as program code and/or data stored on one or more computer readable mediums to implement the various applications, data, and steps described here. For example, such instructions may be stored in one or more computer readable media, such as internal memories and/or external data storage devices accessible over network 1040.

Acquirer host 1042 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 1044 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Network 1040 may be implemented as a single network or a combination of multiple networks. For example, in various embodiments, network 1040 may include the Internet or one or more intranets, landline networks, wireless networks, and/or other appropriate types of networks. Although not shown in FIG. 10, it should be appreciated that the network 1040 may also include a blockchain network, e.g., the blockchain network 145a of FIG. 1, as described above.

User device 1010 may be implemented using any appropriate hardware and software configured for wired and/or wireless communication over network 1040. For example, in one embodiment, the user device may be implemented as a personal computer (PC), a smart phone, a smart phone with additional hardware such as NFC chips, Bluetooth Low Energy (BLE) hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data.

User device 1010 may include a browser application 1011 that may be used, for example, to provide a convenient interface to permit user 1005 to browse information available over network 1040. For example, in one embodiment, browser 1011 may be implemented as a web browser configured to view information available over the Internet. In some implementations, the user device 1010 may also include one or more toolbar applications 1012 that can be used to provide a user interface in connection with browser 1011 and to perform client-side operations for various desired tasks selected by the user 1005 via the user interface. Additionally, the user device 1010 may include any of various other applications 1015 that may be used to provide different types of functionality for the user 1005, such as email, texting, voice and instant messaging (IM) applications that allow user 1005 to send and receive emails, calls, and texts through network 1040, as well as applications that enable the user to communicate, transfer information, make payments, and otherwise utilize a digital wallet through the payment provider as described herein.

In some embodiments, the other applications 1015 on the user device 1010 may include a payment application developed by the payment provider or another entity to facilitate payment transactions initiated by the user 1005 at the user device 1010. Such payment transactions may be processed by the payment provider server 1050 via the payment network 1045. If, for example, the user device 1010 is a mobile device, the payment application may be a mobile application downloadable to the device from an online application store via network 1040. The payment application may allow the user 1005 to send payment transaction requests to the payment service provider server 1050 along with data or information needed to complete the request, such as funding source information. A communications application 1013 of the user device 1010 may provide one or more interfaces that enable the user device 1010 and its applications to communicate with other devices in system 1000 via the network 1040 and/or the payment network 1045.

User device 1010 may store a user identifier 1014, which may be included with payment transaction requests sent from the device 1010 to the payment provider server 1050. The user identifier 1014 may be any unique identifier associated with the user device 1010. The user identifier 1014 may be, for example, a unique registry entry of the device 1010's operating system, a web cookie associated with browser 1011, a unique hardware identifier or address associated with the user device 1010, or any other appropriate identifier that may be used for authentication purposes. In some embodiments, the user identifier 1014 may be used by the payment service provider to identify transactions associated with the user 1005 as well as the associated account of the user 1005 with the payment provider.

In some implementations, the user device 1010 may include a trusted zone 1016 in the form of a secure memory area provisioned by the payment service provider for storing user 1005's credentials or other relevant authentication information. The secure memory area for the trusted zone 1016 may correspond to, for example, a portion of a subscriber identity module (SIM) coupled to the user device 1010. In some cases, the payment service provider may use the trusted zone 1016 to install appropriate software capable of generating secure industry standard payment credentials for transactions initiated by the user 1005 using the device 1010. Such credentials may serve, for example, as a proxy for the user 1005's credentials in the payment providers system. Such credentials may be associated with a corresponding user account maintained by the payment service provider, which the user 1005 may use for online shopping and purchases of goods or services from a merchant website, e.g., as hosted on the merchant server 1060.

The merchant server 1060 may be associated with a merchant offering various products and/or services for sale to different users, including user 1005. The merchant may have a physical point-of-sale (POS) store front. The merchant may be a participating merchant who has a merchant account with the payment service provider. Merchant server 1060 may be used for POS or online purchases and transactions. Generally, merchant server 1060 may be maintained by any person or any entity that can receive money, which includes charities as well as retailers and restaurants. For example, a purchase transaction may be payment or gift to an individual. Merchant server 1060 may include a database 1062 identifying available products and/or services (e.g., collectively referred to as items) which may be made available for viewing and purchase by user 1005. Accordingly, merchant server 1060 also may include a marketplace application 1064 which may be configured to serve information over network 1040 to browser 1011 or other application 1015 of user device 1010, as described above. In some embodiments, user 1005 may interact with marketplace application 1064 through browser 1011 over network 1040 in order to view various products, items, or services identified in database 1062.

Merchant server 1060 also may include a checkout application 1066 which may be configured to facilitate purchases by user 1005 of goods or services online or at a physical POS or store front. Checkout application 1066 may be configured to accept payment information from or on behalf of user 1005 through payment provider server 1050 over network 1040. For example, checkout application 1066 may receive and process a payment confirmation from payment provider server 1050, as well as transmit transaction information to the payment provider and receive information from the payment provider (e.g., a transaction ID). Checkout application 1066 may be configured to receive payment via a plurality of payment methods including cash, credit cards, debit cards, checks, money orders, or the like.

Payment provider server 1050 may be associated with an online payment service provider that facilitates electronic transactions between the user 1005 and the merchant associated with the merchant server 1060. The user 1005 may be, for example, an online consumer interested in purchasing one or more items offered for sale by the merchant. The user 1005 may utilize user device 1010 to initiate an electronic transaction with the merchant, which is processed by or through the payment service provider using payment provider server 1050. In this regard, payment provider server 1050 may include one or more payment applications 1051 that may be configured to interact with user device 1010 and/or merchant server 1060 over network 1040 to facilitate the purchase of goods or services, communicate/display information, and send payments by user 1005 of user device 1010.

The payment provider server 1050 also maintains a plurality of user accounts 1052, each of which may include account information 1053 associated with consumers, merchants, and funding sources, such as credit card companies. For example, account information 1053 may include private financial information of users of devices such as account numbers, passwords, device identifiers, usernames, phone numbers, credit card information, bank information, or other financial information which may be used to facilitate online transactions by user 1005. Advantageously, payment application 1051 may be configured to interact with merchant server 1060 on behalf of user 1005 during a transaction with checkout application 1066 to track and manage purchases made by users and which and when funding sources are used.

A transaction processing application 1054, which can be a standalone application or part of payment application 1051, may be configured to receive information from user device 1010 and merchant server 1060 for processing payment transactions and storing transaction data in a payment database 1055. Transaction processing application 1054 may include one or more applications to process information from user 1005 for processing an order and payment using various selected funding instruments, as described here. As such, transaction processing application 1054 may store details of an order from individual users, including funding source used, credit options available, etc. Payment application 1051 may be further configured to determine the existence of and to manage accounts for user 1005, as well as create new accounts if necessary.

The payment provider server 1050 may also include an on-chain program manager 1056 that may be used to provide a merchant interface that allows the merchant to configure reward criteria for different categories of digital tokens as part of the merchant's loyalty program. The tokens may be distributed to users who satisfy the reward criteria, e.g., as determined by the on-chain program manager 1056 based on transactions between the user device 1010 and the merchant server 160, which may be processed and monitored by the service provider for the merchant's loyalty program. In some embodiments, the on-chain program manager 1056 of the service provider may work in conjunction with one or more of the applications on the user device 1010 to facilitate the transaction processing and monitoring.

The on-chain program manager 1056 may automatically distribute the tokens earned by user 1005 to a specified destination address. The destination address may correspond to, for example, a digital wallet of the user 1005. In some implementations, the digital wallet may be a wallet application executable at the user device 1010. The user 1005 may therefore utilize user device 1010 to receive rewards offered by the merchant as part of the merchant's customer loyalty program. The user 1005 may then use the user device 1010 to accept and/or redeem offers and incentives associated with such tokens, either by visiting the merchant's web site (provided by merchant server 1060) or the merchant's brick-and-mortar store. Further, user 1005 may utilize user device 1010 to initiate a payment transaction, receive a transaction approval request, or reply to the request via payment network 1045.

The payment network 1045 in FIG. 10 may be operated by, for example, payment card service providers or card associations, such as DISCOVER™, VISA™ MASTER-CARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction. In addition to payment transactions, it should be appreciated that system 1000 may be used to facilitate other types of transactions, e.g., transactions involving the transfer or display of information, based on the user 1005's interactions with the merchant or the payment provider via the user device 1010. Although only one merchant server is shown, a plurality of merchant servers may be utilized if the user is purchasing products from multiple merchants.

Figure 11:
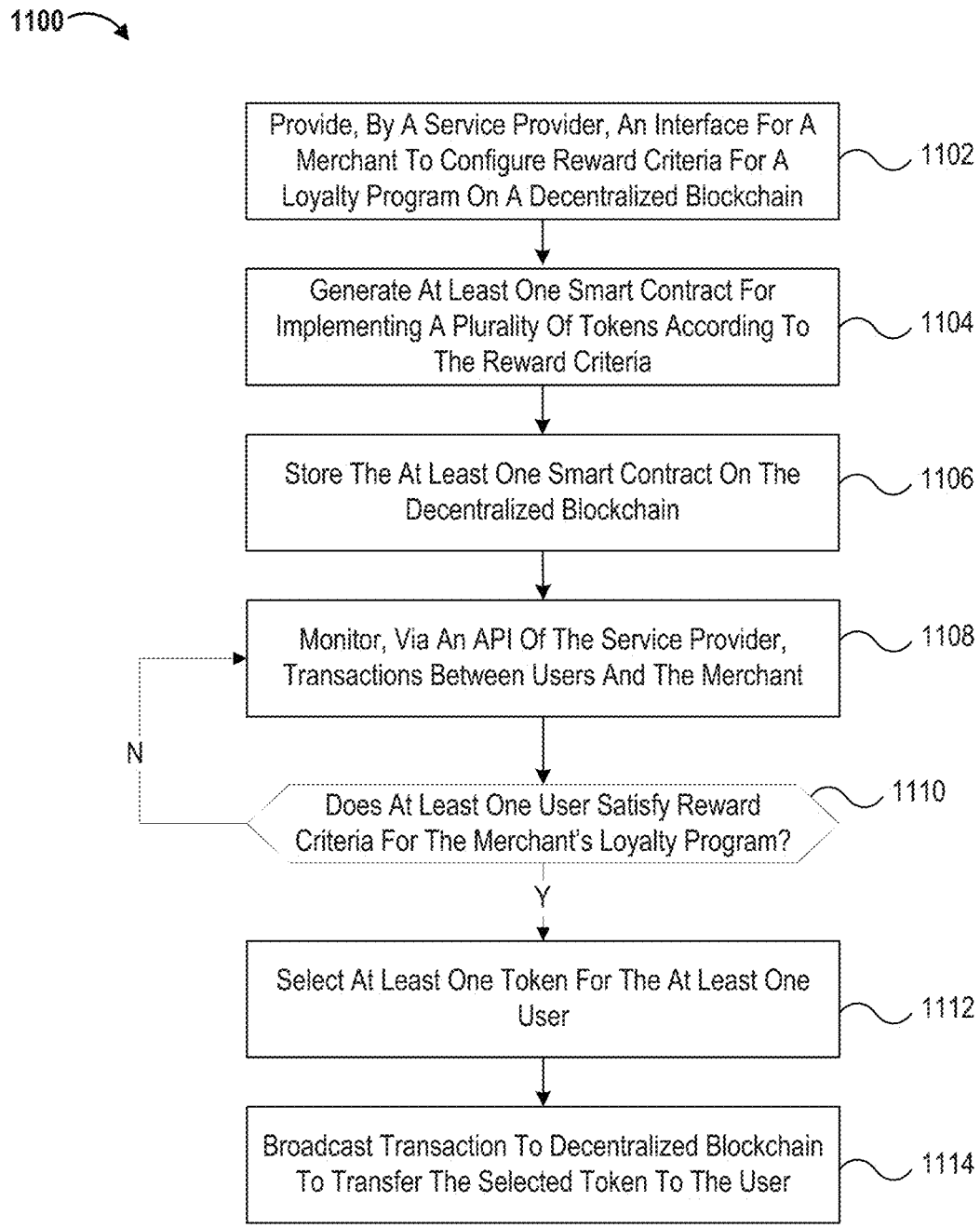
FIG. 11 is a flow diagram of a process for managing a loyalty program of a merchant using a decentralized blockchain, according to an embodiment of the present disclosure.

FIG. 11 is a flow diagram of a process 1100 for managing a loyalty program of an entity, e.g., a merchant, using a decentralized blockchain, according to an embodiment of the present disclosure. While process 1100 is described with respect to an on-chain loyalty program of a merchant, it should be appreciated that the disclosed on-chain program management techniques are not intended to be limited thereto and that these techniques may be applied to on-chain programs associated with any of various entities. Such entities may include, for example, entities involved at different stages of a supply chain, as described above. Additionally, such entities may include non-profit charitable organizations that award promotional badges in the form of fungible, non-fungible, or semi-fungible tokens to users who donate to certain charities. The decentralized blockchain may be, for example, the Ethereum blockchain or another blockchain that is compatible with the Ethereum virtual machine (EVM). For discussion purposes, process 1100 will be described using systems 100 and 1000 of FIGS. 1 and 10, respectively, as described above. However, process 1100 is not intended to be limited thereto.

As shown in FIG. 11, process 1100 may begin in block 1102, which includes providing, by a service provider, an interface for a merchant to configure reward criteria for a loyalty program associated with the merchant on a decentralized blockchain. It should be appreciated that any of various interfaces may be provided to the merchant for this purpose. In some implementations, the interface may be in the form of a secure website accessible to the merchant using a standard web browser. The secure website may require the merchant to log into the site using authentication credentials (e.g., username and password) associated with an account registered for the merchant in a payment processing system of the service provider. In some embodiments, the service provider may be a payment service provider that implements the on-chain loyalty program on behalf of the merchant while also providing various payment services, e.g., payment processing services related to the transactions between the merchant and different users, as described above. The on-chain loyalty program may be implemented using, for example, on-chain program manager 1056 of the payment provider server 1050 of FIG. 10, as described above.

Process 1100 may then proceed to block 1104, which includes generating at least one smart contract for implementing a plurality of tokens in accordance with the reward criteria configured by the merchant via the interface provided at block 1102. Each of the plurality of tokens may correspond to, for example, one of a plurality of token categories associated with the merchant's loyalty program. The reward criteria configured by the merchant for each token category in this example may be different from those configured for other token categories. In some embodiments, the token categories may represent different reward categories for the loyalty program. Examples of such reward categories may include, but are not limited to, promotional badges, collectibles, cryptocurrency, and loyalty points. In some embodiments, the smart may be generated with a programmable grammar-based syntax for implementing the tokens in each token category, e.g., as described above with respect to NFT 700 of FIG. 7. The tokens in each token category may be generated with token properties based on the reward criteria configured by the merchant for that token category. The token properties of the tokens in each token category may include, for example, a token type and a transferability status. The types of tokens in each token category may include fungible tokens, non-fungible tokens, semi-fungible tokens, or any combination of the foregoing. The transferability status of the tokens in each category may be set in the smart contract to either transferrable or non-transferrable.

In some implementations, a separate smart contract may be generated for each token category. Thus, block 1104 may include, for example, generating a plurality of smart contracts corresponding to the plurality of token categories, where each of the smart contracts includes a programmable grammar-based syntax for implementing tokens in a corresponding token category. In some embodiments, the service provider may provide on-chain loyalty program management for different merchants with a separate smart contract generated for each merchant according to the reward criteria configured by that merchant via the interface provided at block 1102. Alternatively, the service provider may employ a single, universal smart contract (e.g., a master token contract) for all merchant loyalty programs managed by the service provider. It should be appreciated, however, that the interface provided for the merchants to configure the reward criteria for their respective programs may be a standard interface (e.g., a standard web form) for all merchants to use or a customized interface specific to each merchant and the goals it hopes to achieve through the loyalty program.

In block 1106, the generated smart contract(s) for the loyalty program of the merchant in this example may be stored on the decentralized blockchain, e.g., in association with a unique identifier for the merchant.

Process 1100 may then proceed to block 1108, which includes monitoring, via an application programming interface (API) of the service provider, the transactions between the users and the merchant.

Based on the monitoring in block 1108, a determination may be made in block 1110 as to whether at least one of the users has satisfied the reward criteria configured by the merchant via the interface provided in block 1102 for the merchant's loyalty program. If no users have satisfied the reward criteria for at least one reward or token category, process 1100 may return to block 1108 to continue monitoring transactions until it has been determined in block 1110 that at least one user has satisfied the reward criteria, in which case process 1100 may proceed to block 1112.

Block 1112 may include selecting at least one token from among the plurality of tokens for the user, based on the smart contract associated with the merchant.

In block 1114, a transaction may be broadcasted to the decentralized blockchain for transferring at least token to a digital wallet of the user. In some embodiments, the user may have an account registered with the service provider, and the digital wallet may be managed by the service provider, e.g., as part of the account services provided to the user. The digital wallet for the user may be associated with a unique identifier, e.g., as assigned to the user during an initial registration process for a user account with the service provider. The digital wallet of the user may be, for example, one of a plurality of digital wallets managed by the service provider for different users based on the identifier associated with each user. In some implementations, the plurality of digital wallets may be maintained as part of a single omnibus digital wallet associated with the service provider and shared with registered users of the service provider, e.g., as part of a digital wallet application or service provided by the service provider. Such a wallet application may enable each user to initiate transactions involving the purchase of items offered for sale by a merchant via an online or virtual marketplace, e.g., marketplace application 1064 of FIG. 10, as described above, provided by the merchant.

Client-Server System

Figure 12:
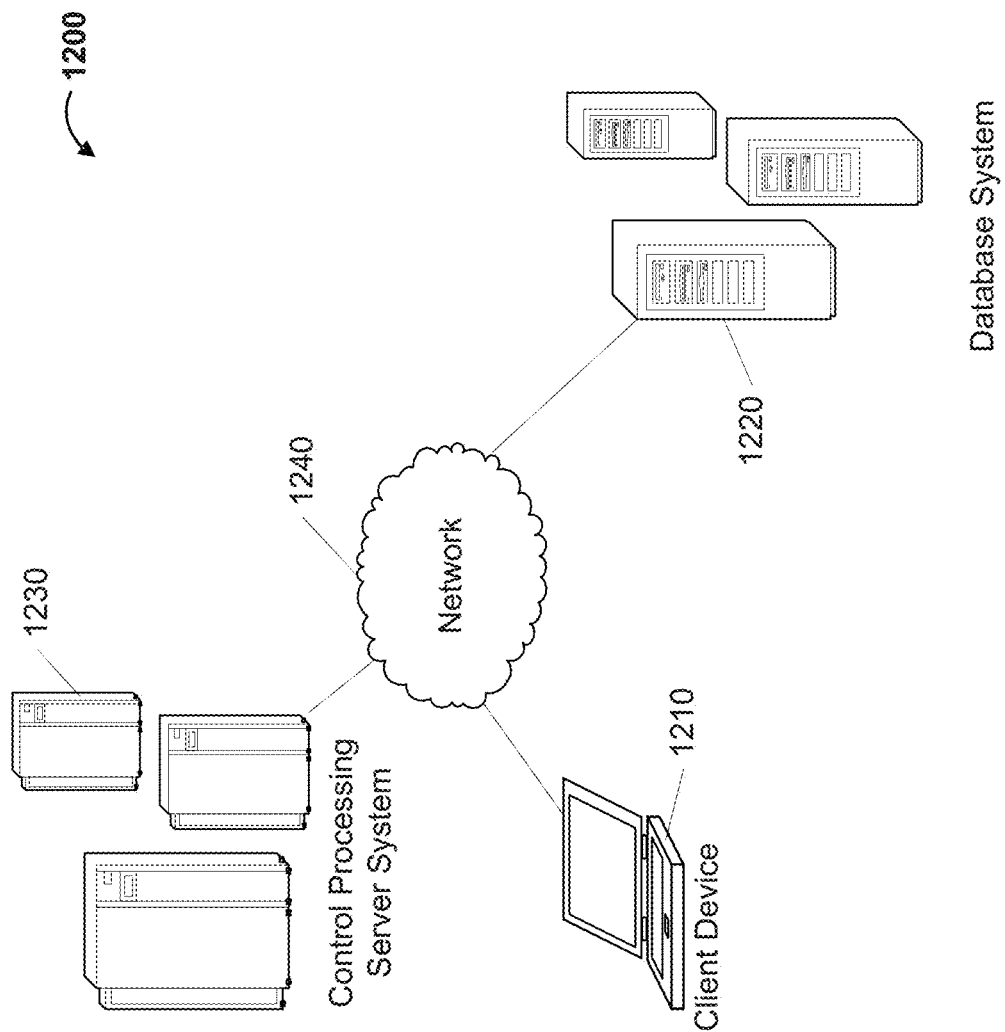
FIG. 12 is a block diagram that illustrates an example of a client-server system in which embodiments of the present disclosure may be implemented.

FIG. 12 shows an example of a client-server system 1200 in which embodiments of the present disclosure may be implemented. The system 1200 may include at least one client device 1210, at least one database system 1220, and/or at least one server system 1230 in communication via a network 1240. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 12.

Client device 1210 may access server applications and/or resources using one or more client applications (not shown) as described herein. Client device 1210 may be a mobile device, such as a laptop, smart phone, mobile phones, or tablet, or computing devices, such as a desktop computer or a server, wearables, embedded devices. Alternatively, client device 1210 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1220 may be configured to maintain, store, retrieve, and update information for server system 1230. Further, database system may provide server system 1230 with information periodically or upon request. In this regard, database system 1220 may be a distributed database capable of storing, maintaining, and updating large volumes of data across clusters of nodes. Database system 1220 may provide a variety of databases including, but not limited to, relational databases, hierarchical databases, distributed databases, in-memory databases, flat file databases, XML databases, NoSQL databases, graph databases, and/or a combination thereof.

Server system 1230 may be configured with a server application (not shown) that is capable of interfacing with client application and database system 1220 as described herein. In this regard, server system 1230 may be a stand-alone server, a corporate server, or a server located in a server farm or cloud-computer environment. According to some examples, server system 1230 may be a virtual server hosted on hardware capable of supporting a plurality of virtual servers.

Network 1240 may include any type of network. For example, network 1240 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1200 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1200 in front of one or more computing devices such that any external devices may communicate directly with the specialized hardware.

Computing Device

Figure 13:
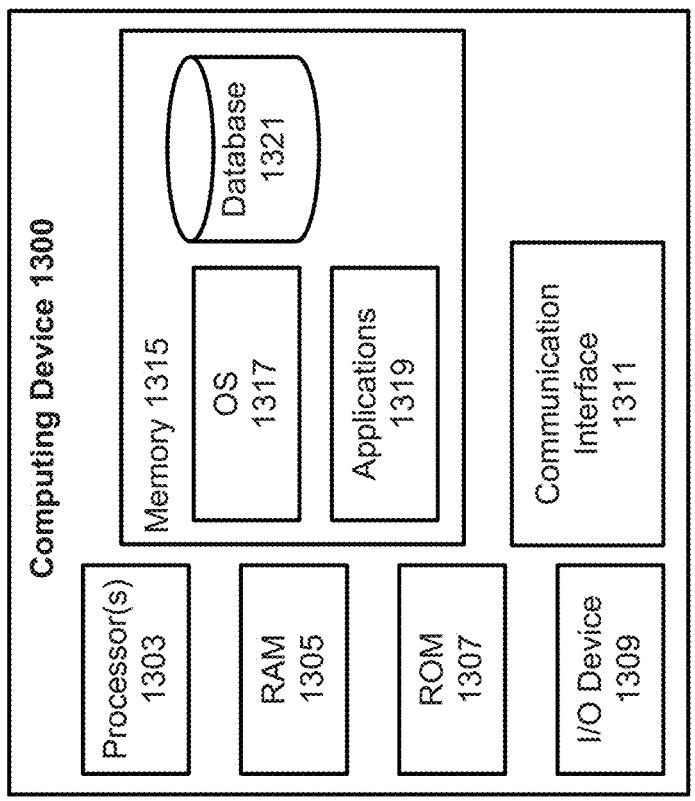
FIG. 13 is a block diagram that illustrates an example of a computing device in which embodiments of the present disclosure may be implemented.

Turning now to FIG. 13, a computing device 1300 that may be used to implement one or more of the disclosed embodiments is described. The computing device 1300 may include a processor 1303 for controlling overall operation of the computing device 1300 and its associated components, including RAM 1305, ROM 1307, input/output (I/O) device 1309, communication interface 1311, and/or memory 1315. A data bus may interconnect processor(s) 1303, RAM 1305, ROM 1307, memory 1315, I/O device 1309, and/or communication interface 1311. In some embodiments, computing device 1300 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1309 may include a microphone, keypad, touch screen, and/or stylus motion, gesture, through which a user of the computing device 1300 may provide input. I/O device 1309 may also include one or more of a speaker for providing audio output and a video display device for providing textual, audiovisual, and/or graphical output. Software may be stored within memory 1315 to provide instructions to processor 1303 allowing computing device 1300 to perform various actions. For example, memory 1315 may store software used by the computing device 1300, such as an operating system 1317, application programs 1319, and/or an associated internal database 1321. The various hardware memory units in memory 1315 may include volatile and nonvolatile, removable and non-removable media implemented in any method or technology for storage of information such as computer-readable instructions, data structures, program modules, or other data. Memory 1315 may include one or more physical persistent memory devices and/or one or more non-persistent memory devices. Memory 1315 may include, but is not limited to, random access memory (RAM) 1305, read only memory (ROM) 1307, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1303.

Communication interface 1311 may include one or more transceivers, digital signal processors, and/or additional circuitry and software for communicating via any network, wired or wireless, using any protocol as described herein.

Processor 1303 may include a single central processing unit (CPU), e.g., a single-core or multi-core processor, or may include multiple CPUs. Processor(s) 1303 and associated components may allow the computing device 1300 to execute a series of computer-readable instructions to perform some or all of the processes described herein. Although not shown in FIG. 13, various elements within memory 1315 or other components in computing device 1300, may include one or more caches, for example, CPU caches used by the processor 1303, page caches used by the operating system 1317, disk caches of a hard drive, and/or database caches used to cache content from database 1321. For embodiments including a CPU cache, the CPU cache may be used by one or more processors 1303 to reduce memory latency and access time. A processor 1303 may retrieve data from or write data to the CPU cache rather than reading/writing to memory 1315, which may improve the speed of these operations. In some examples, a database cache may be created in which certain data from a database 1321 is cached in a separate smaller database in a memory separate from the database, such as in RAM 1305 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1300 are described separately, functionality of the various components may be combined and/or performed by a single component and/or multiple computing devices in communication without departing from the invention.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   a non-transitory memory; and
   one or more hardware processors coupled to the non-transitory memory and configured to read instructions from the non-transitory memory to cause the system to perform operations comprising:
   monitoring, via an application programming interface (API) of a service provider for a merchant on a decentralized blockchain, transactions between users and the merchant made using the service provider, wherein the transactions include purchases made by the users of products sold by the merchant, and wherein the service provider implements a loyalty program associated with the merchant;
   determining, based on the monitoring, that at least one of the users has satisfied reward criteria for the loyalty program, wherein the determining comprises:
   determining that a number of purchases within a period of time made by the at least one of the users passes at least one threshold in the reward criteria; and
   determining a plurality of tokens to be distributed in the loyalty program based on the at least one threshold in the reward criteria to the at least one of the users who has satisfied the reward criteria configured by the merchant via a merchant interface;
   in response to the determining that the at least one of the users has satisfied the reward criteria, automatically selecting at least one token from the plurality of tokens to be distributed to the at least one of the users, based on at least one smart contract associated with the merchant, and the reward criteria, wherein:
   the at least one smart contract is stored on the decentralized blockchain in association with a unique identifier for the merchant,
   the at least one token corresponds to one of a plurality of token categories associated with the loyalty program, and
   the at least one smart contract is generated based on the one of the plurality of token categories; and
   broadcasting a transaction to the decentralized blockchain for transferring the at least one token to a digital wallet of the at least one of the users.

2. The system of claim 1, wherein each of the plurality of tokens corresponds to one of a plurality of token categories associated with the loyalty program, and wherein the reward criteria configured by the merchant for each token category is different from other token categories of the plurality of token categories.

3. The system of claim 2, wherein the token categories represent different reward categories for the loyalty program, and the different reward categories include promotional badges, collectibles, cryptocurrency, and loyalty points.

4. The system of claim 2, wherein the at least one smart contract is a plurality of smart contracts corresponding to the plurality of token categories, and each of the smart contracts includes a programmable grammar-based syntax for implementing tokens in a corresponding token category.

5. The system of claim 2, wherein tokens in each token category are generated with token properties based on the reward criteria configured by the merchant for that token category.

6. The system of claim 5, wherein the token properties of the tokens in each token category include a token type and a transferability status.

7. The system of claim 6, wherein:
the token type of the tokens in each token category is selected from the group consisting of: fungible tokens; non-fungible tokens; and semi-fungible tokens; and
the transferability status of the tokens in each token category is selected from the group consisting of: transferrable and non-transferrable.

8. A method comprising:
providing, by a service provider, an interface for an entity different from the service provider to configure reward criteria for a loyalty program associated with the entity on a decentralized blockchain, the loyalty program including a plurality of tokens to be distributed to users who satisfy the reward criteria configured by the entity, and the loyalty program implemented by the service provider;
generating at least one smart contract for implementing the plurality of tokens in accordance with the reward criteria configured by the entity for the loyalty program via the interface;
storing the at least one smart contract for the loyalty program on the decentralized blockchain in association with a unique identifier for the entity;
monitoring, via an application programming interface (API) of the service provider, transactions between the users and the entity made using the service provider, wherein the transactions include purchases made by the users of products sold by the entity;
determining that at least one of the users has satisfied the reward criteria, based on the monitoring, wherein the determining comprises:
determining that a number of purchases within a period of time made by the at least one of the users passes at least one threshold in the reward criteria; and
determining, based on the at least one threshold in the reward criteria, a plurality of tokens to be distributed to the at least one of the users who has satisfied the reward criteria configured by the entity via an entity interface;
in response to the determining that the at least one of the users has satisfied the reward criteria, automatically selecting at least one token from the plurality of tokens to be distributed to the at least one of the users who has satisfied the reward criteria, based on the at least one smart contract associated with the entity and the reward criteria, wherein:
the at least one token corresponds to one of a plurality of token categories associated with the loyalty program, and
the at least one smart contract is generated based on the one of the plurality of token categories; and
broadcasting a transaction to the decentralized blockchain for transferring the at least one token to a digital wallet of the at least one of the users.

9. The method of claim 8, wherein the entity is a merchant, and the loyalty program is associated with the merchant.

10. The method of claim 8, wherein the smart contract is generated with a programmable grammar-based syntax for implementing each of the plurality of tokens in accordance with the reward criteria configured by the entity via the interface.

11. The method of claim 10, wherein the at least one token is selected for the at least one user, based on a corresponding portion of the programmable grammar-based syntax of the at least one smart contract.

12. The method of claim 8, wherein:
each of the plurality of tokens corresponds to one of a plurality of token categories associated with the loyalty program;
the reward criteria configured by the entity for each token category is different from other token categories of the plurality of token categories; and
tokens in each token category are generated with token properties based on the reward criteria configured by the entity for that token category.

13. The method of claim 12, wherein the token properties of the tokens in each token category include a token type and a transferability status.

14. The method of claim 13, wherein:
the token type of the tokens in each token category is selected from the group consisting of: fungible tokens; non-fungible tokens; and semi-fungible tokens; and
the transferability status of the tokens in each token category is selected from the group consisting of: transferrable and non-transferrable.

15. A non-transitory machine-readable medium having stored thereon machine-readable instructions executable to cause a machine to perform operations comprising:
monitoring, via an application programming interface (API) of a service provider for a merchant on a decentralized blockchain, transactions between users and a merchant made using the service provider, wherein the transactions include involving purchases made by the users of products sold by the merchant;
determining, based on the monitoring, that at least one of the users has satisfied reward criteria for a loyalty program associated with the merchant and implemented by the service provider, wherein the determining comprises:
determining that a number of purchases within a period of time made by the at least one of the users passes at least one threshold in the reward criteria; and
determining a plurality of tokens to be distributed in the loyalty program based on the at least one threshold in the reward criteria to the at least one of users who has satisfied the reward criteria;
in response to the determining that the at least one of the users has satisfied the reward criteria, automatically selecting at least one token from the plurality of tokens to be distributed for the at least one of the users, based on at least one smart contract associated with the merchant and the reward criteria, wherein:

the at least one smart contract is stored on the decentralized blockchain in association with a unique identifier for the merchant, the at least one token corresponds to one of a plurality of token categories associated with the loyalty program, and the at least one smart contract is generated based on the one of the plurality of token categories; and broadcasting a transaction to the decentralized blockchain for transferring the at least one token to a digital wallet of the at least one of the users.

16. The non-transitory machine-readable medium of claim 15, wherein the operations further comprise:

providing, via the API of the service provider, a first interface for the merchant to configure the reward criteria for the loyalty program;

generating the at least one smart contract with a programmable grammar-based syntax for implementing the plurality of tokens in accordance with the reward criteria configured by the merchant via the first interface; and storing the at least one smart contract for the loyalty program on the decentralized blockchain in association with a unique identifier for the merchant.

17. The non-transitory machine-readable medium of claim 15, wherein the operations further comprise:

providing, via the API of the service provider, a second interface for the user to view and interact with the at least one token and other tokens transferred to the digital wallet of the at least one user as part of the loyalty program.

18. The non-transitory machine-readable medium of claim 15, wherein:

each of the plurality of tokens corresponds to one of a plurality of token categories associated with the loyalty program;

the reward criteria configured by the merchant for each token category is different from other token categories of the plurality of token categories; and tokens in each token category are generated with token properties based on the reward criteria configured by the merchant for that token category.

19. The non-transitory machine-readable medium of claim 18, wherein the token properties of the tokens in each token category include a token type and a transferability status.

20. The non-transitory machine-readable medium of claim 19, wherein:

the token type of the tokens in each token category is selected from the group consisting of: fungible tokens; non-fungible tokens; and semi-fungible tokens; and the transferability status of the tokens in each token category is selected from the group consisting of: transferrable and non-transferrable.

* * * * *

UNITED STATES PATENT AND TRADEMARK OFFICE
CERTIFICATE OF CORRECTION

| | |
|---|---|
| PATENT NO. | : 11,893,598 B1 |
| APPLICATION NO. | : 17/816109 |
| DATED | : February 6, 2024 |
| INVENTOR(S) | : Alon Navon et al. |

It is certified that error appears in the above-identified patent and that said Letters Patent is hereby corrected as shown below:

In the Claims

Claim 15, Column 40, Line 51, change "transactions include involving purchases made" to --transactions include purchases made--.

Signed and Sealed this
Second Day of April, 2024

Katherine Kelly Vidal
*Director of the United States Patent and Trademark Office*